United States Patent [19]

Miller et al.

[11] Patent Number: 4,560,856
[45] Date of Patent: Dec. 24, 1985

[54] PULSED LASER MACHINING APPARATUS

[75] Inventors: Richard A. Miller, North Huntingdon; George D. Bucher, Allison Park, both of Pa.

[73] Assignee: Westinghouse Electric Corp., Pittsburgh, Pa.

[21] Appl. No.: 414,264

[22] Filed: Sep. 1, 1982

[51] Int. Cl.$^4$ .............................. B23K 26/00
[52] U.S. Cl. ............. 219/121 LC; 219/121 LA; 219/121 LB; 219/121 LY; 219/121 LD
[58] Field of Search ........... 219/121 LC, 121 LD, 219/121 LY, 121 LA, 121 LB, 121 LU, 121 LX, 121 EX, 121 EY, 121 EC, 121 ED; 372/14, 15, 16; 376/438–439, 441–442; 364/167, 474, 475

[56] References Cited

U.S. PATENT DOCUMENTS

| | | | |
|---|---|---|---|
| 3,281,712 | 10/1966 | Koester | 372/14 X |
| 3,555,239 | 1/1971 | Kerth | 219/125 |
| 3,622,739 | 11/1971 | Steffen | 219/121 LB X |
| 3,700,850 | 10/1972 | Lumley et al. | 219/121 LB X |
| 3,791,466 | 2/1974 | Patterson et al. | 176/78 |
| 3,858,025 | 12/1974 | Sidbeck et al. | 219/137 |
| 3,966,550 | 6/1976 | Foulds et al. | 176/78 |
| 4,088,890 | 5/1978 | Waters | 250/202 |
| 4,125,755 | 11/1978 | Plamquist | 219/121 LB X |
| 4,154,530 | 5/1979 | Connolly, Jr. et al. | 219/121 LX X |
| 4,164,640 | 8/1979 | Scheffels | 219/121 LB X |
| 4,263,495 | 4/1981 | Fujita et al. | 219/121 LD |
| 4,338,508 | 7/1982 | Jones et al. | 219/121 LX |

FOREIGN PATENT DOCUMENTS 0100948 8/1979 Japan .......................... 219/121 LX

OTHER PUBLICATIONS

F. D. Gagliano, et al., "Lasers in Industry" IEEE, vol. 57, pp. 114–147, Feb. 1969.

*Primary Examiner*—C. L. Albritton
*Attorney, Agent, or Firm*—D. E. Erickson

[57] ABSTRACT

Apparatus and method for directing a controlled number of laser pulses onto a work piece to be machined. More specifically, the laser machining apparatus includes an excitable laser and an excitation lamp for continuously exciting the laser to emit a sequence of laser pulses. The application of the laser pulses to the work piece is controlled by an inner-cavity shutter that is opened to permit a precise number of pulses to be directed onto the work piece. The frequency (REP RATE) and pulse width of the laser pulses are controlled by the excitation lamp and, in turn, are set to create a progressive weld of significant depth and structural integrity. In particular there is provided control means for counting the number of laser pulses applied to a machining site of the work piece, whereby a known controllable quantity of energy is imparted to each site. To this end, the counting of the laser pulses begins after the completion of a laser pulse, whereby the actuation of the inner-cavity shutter is not synchronized to the computer but rather to the laser emission so that only whole laser pulses will be applied to the site.

19 Claims, 42 Drawing Figures

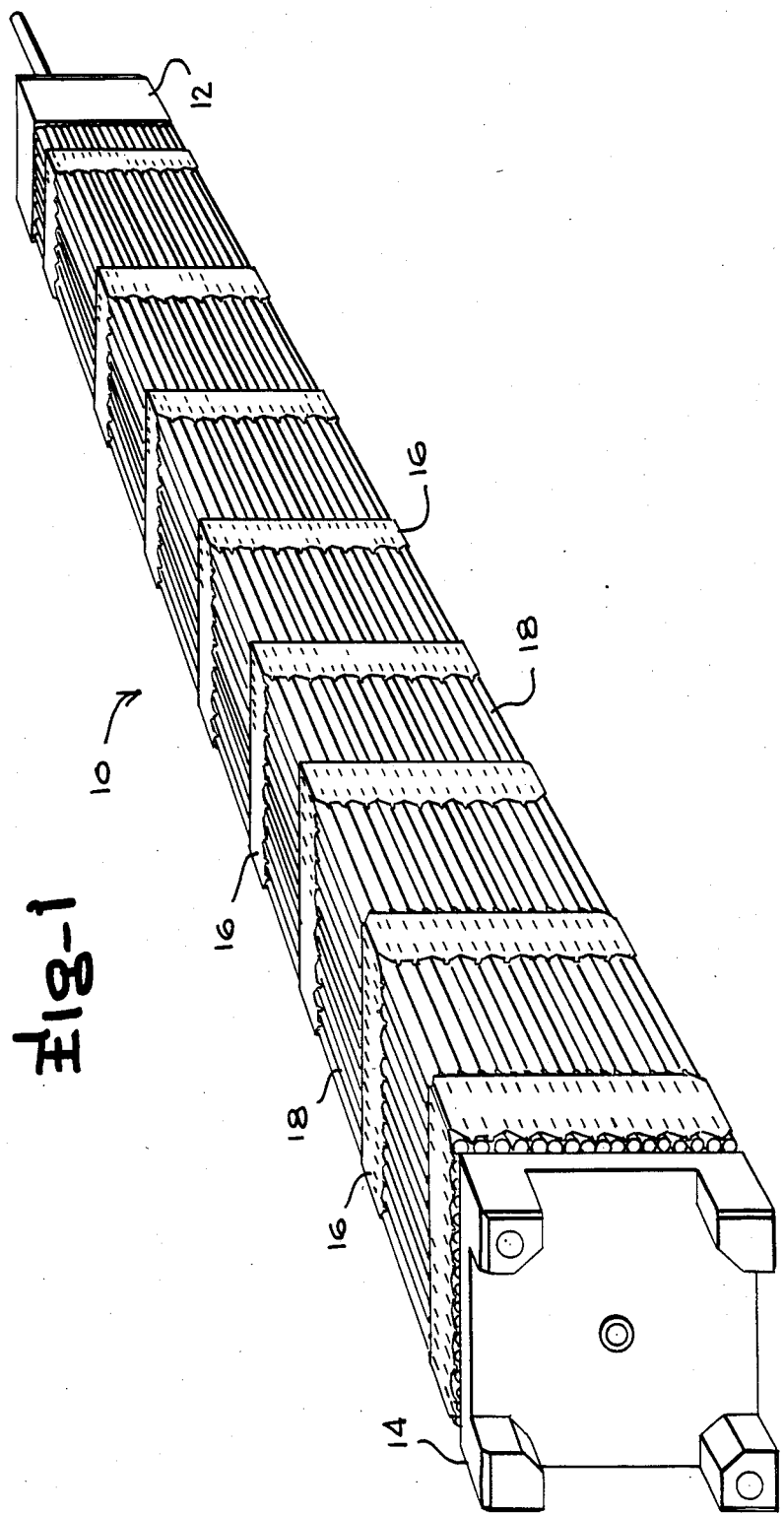

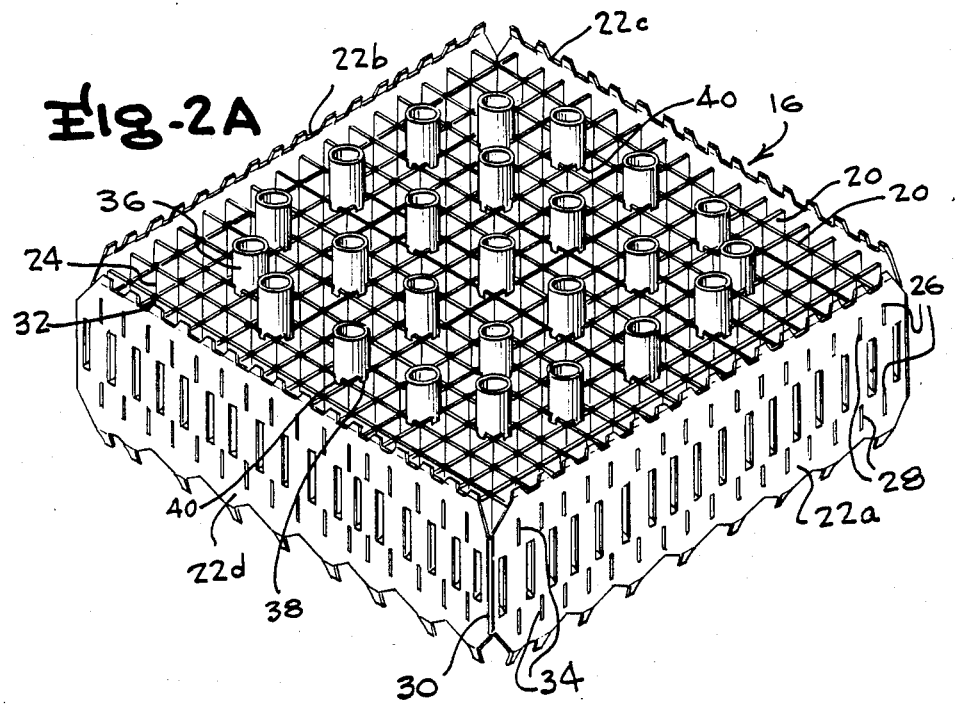
Fig-2A
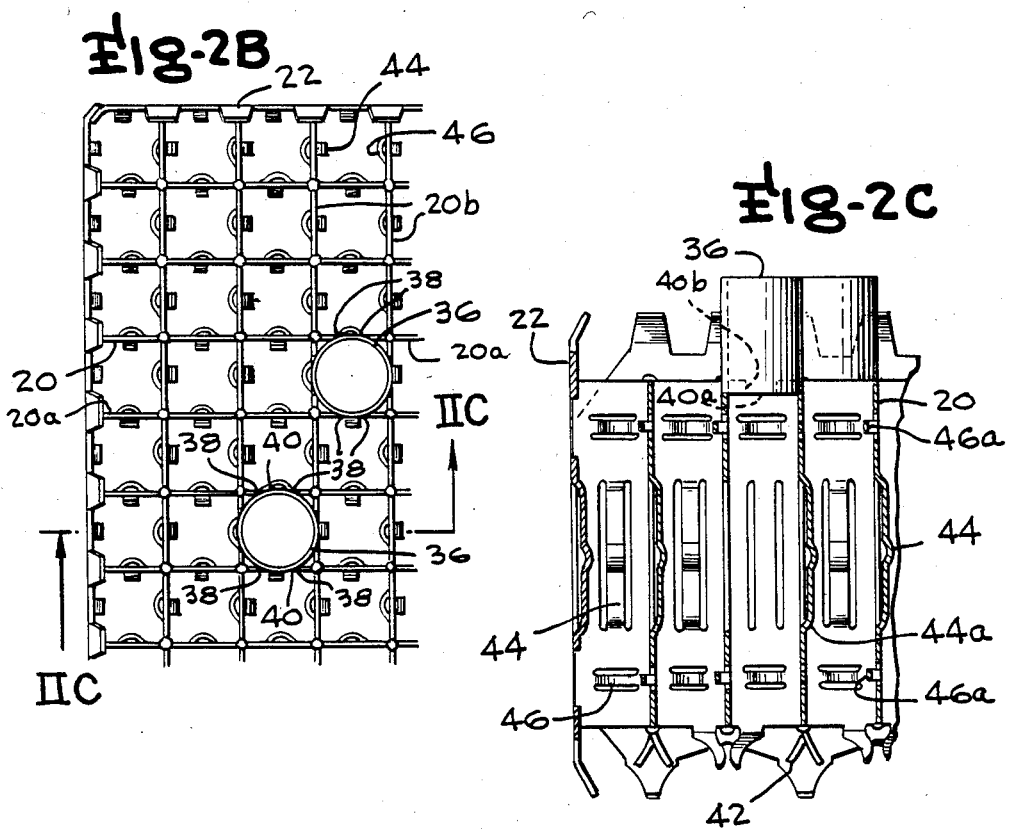
Fig-2B
Fig-2C

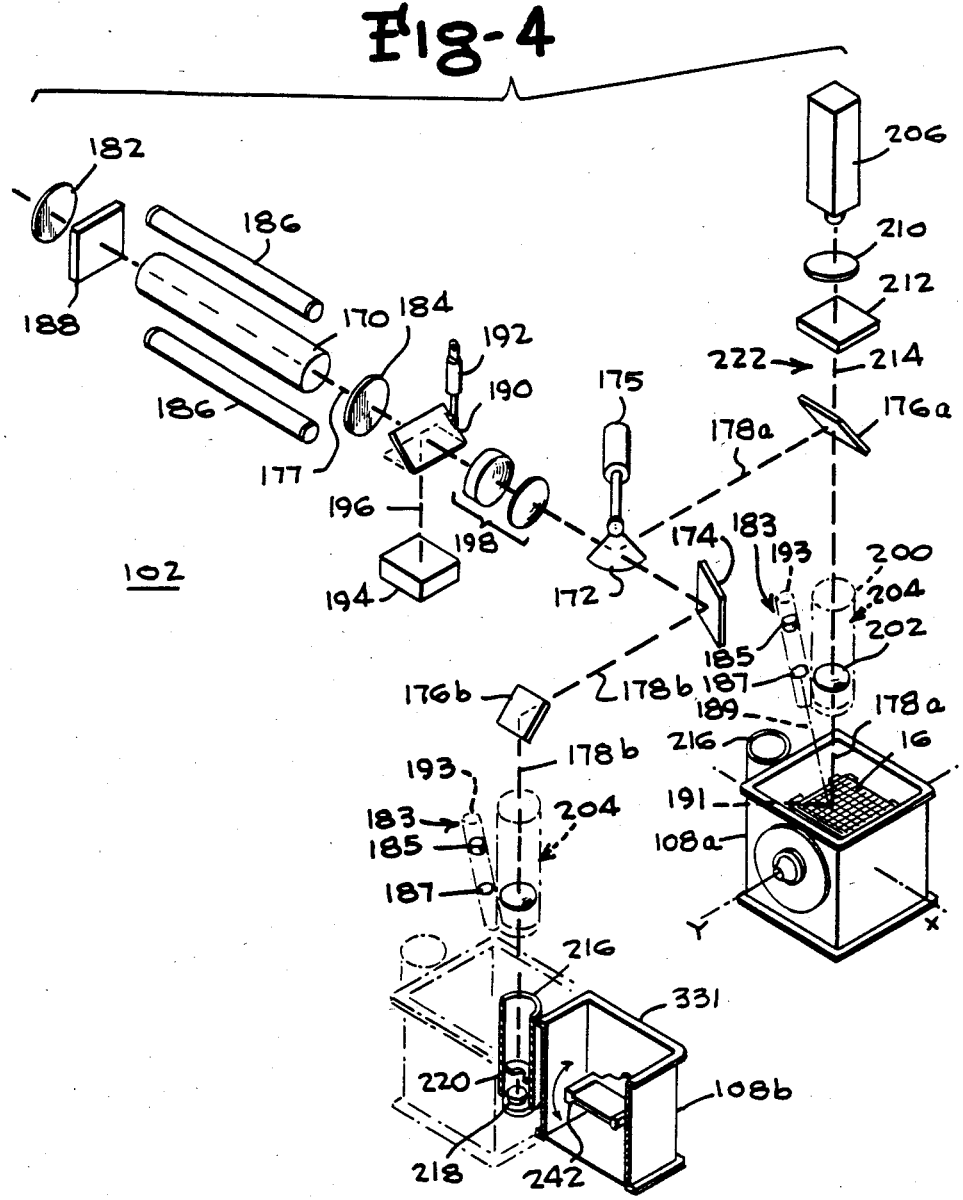

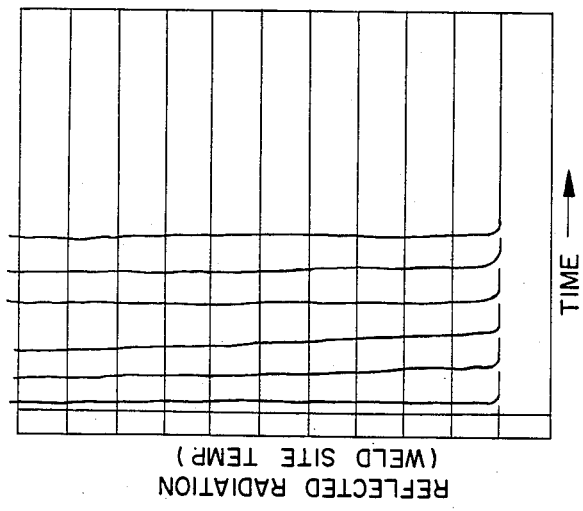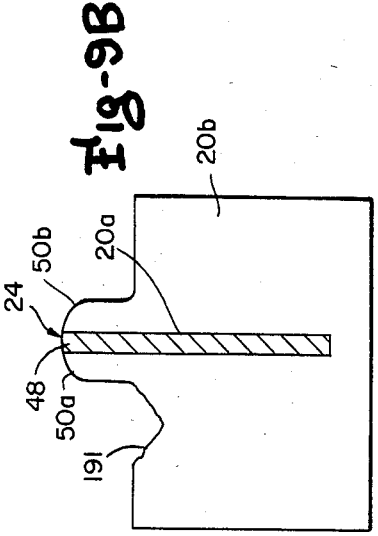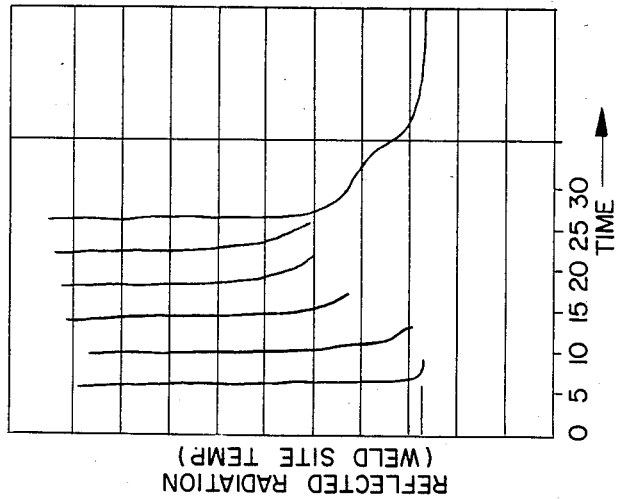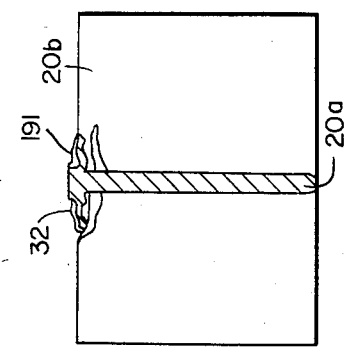

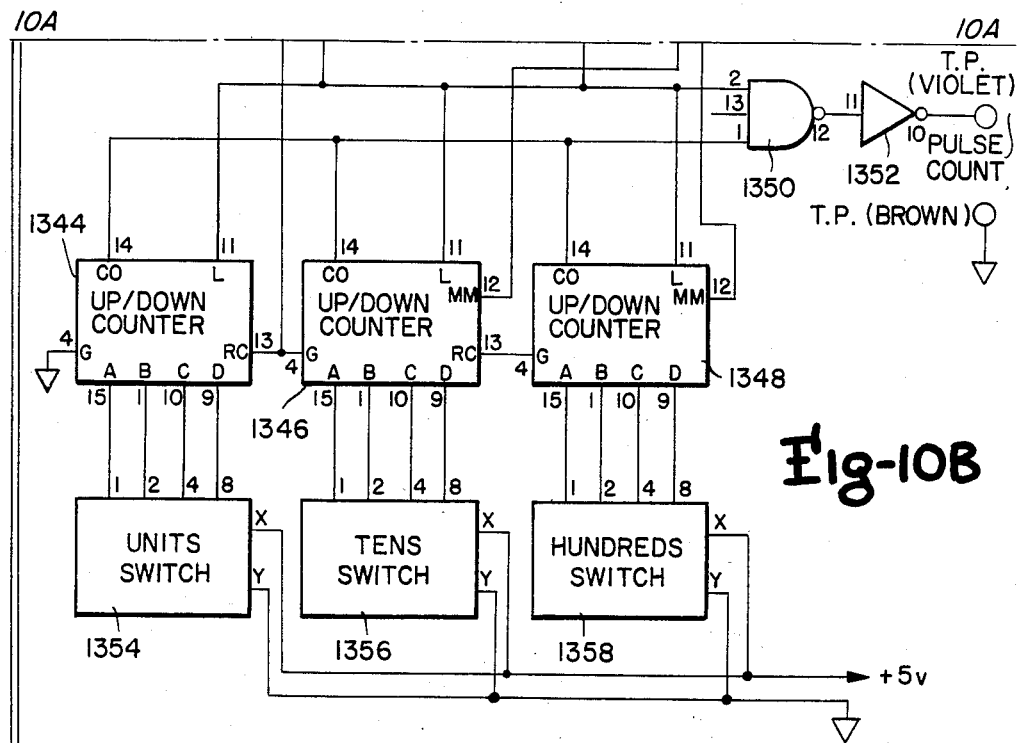
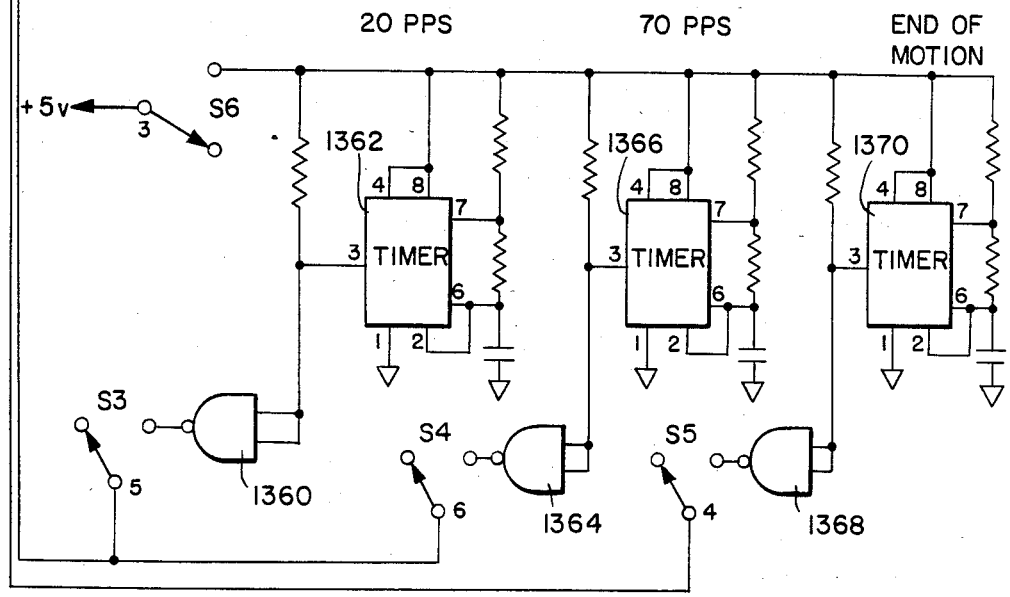
Fig-10B

Fig-11A SYNC
Fig-11B ENABLE
Fig-11C MOTION
Fig-11D LOAD
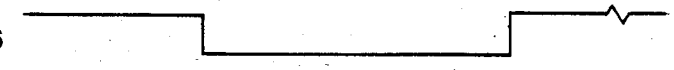
Fig-11E IC8-6
Fig-11F PULSE COUNT (T.P. VIOLET)
Fig-11G RELAY ENERGIZE (T.P. BLUE)

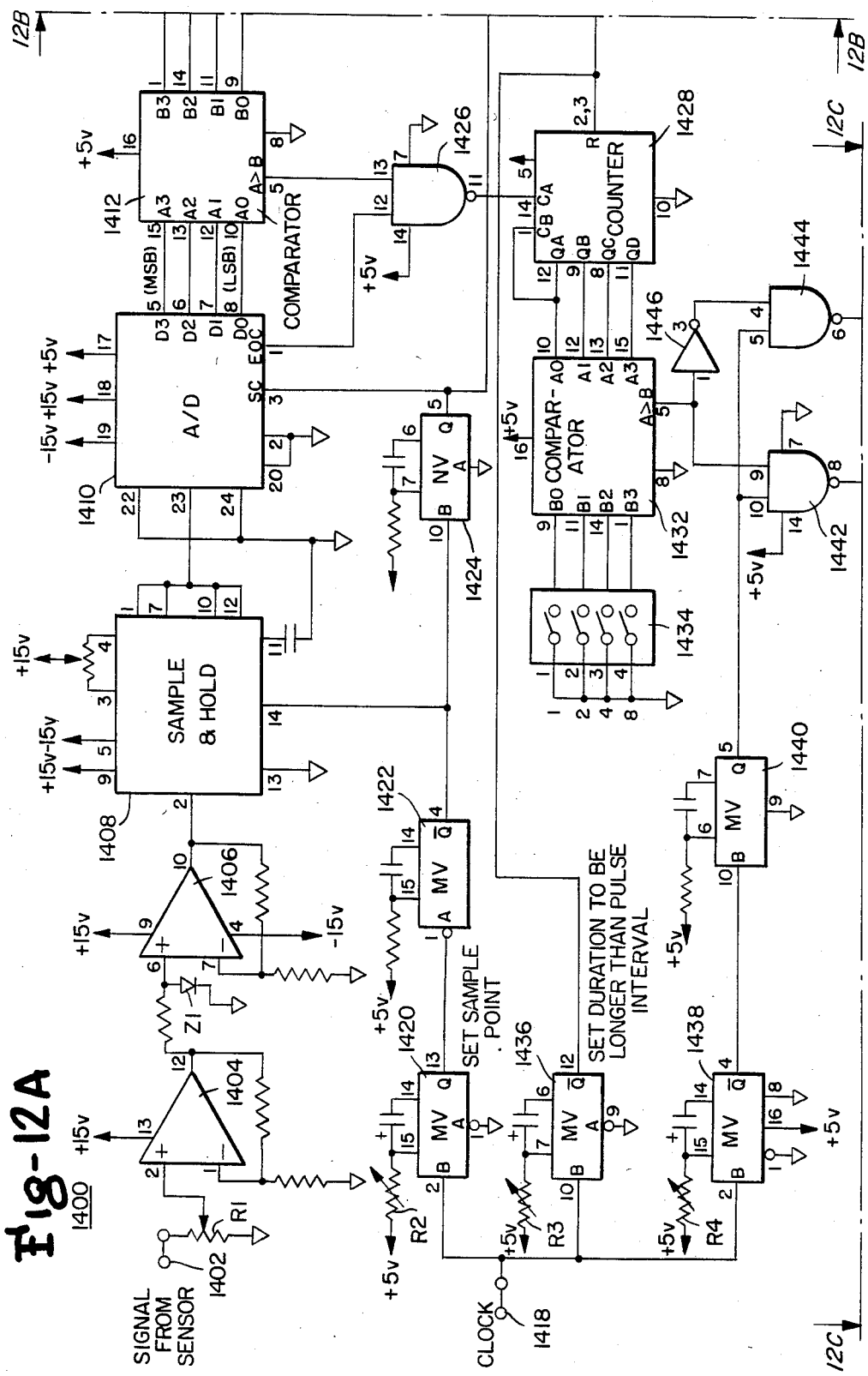

PULSED LASER MACHINING APPARATUS

CROSS-REFERENCE TO COPENDING APPLICATIONS

Attention is drawn to the following copending, commonly assigned applications, all/each filed on even date and incorporated specifically by reference into the instant specification:

(1) "FUEL GRID WITH SLEEVES WELDED IN NOTCHED GRID STRAPS", by R. Duncan, Ser. No. 414,232;
(2) "APPARATUS AND METHOD FOR LASER MACHINING IN NON-REACTIVE ENVIRONMENT", by R. A. Miller and G. G. Lessman, Ser. No. 414,242;
(3) "STRAP AND VANE POSITIONING FIXTURE FOR FUEL ROD GRID AND METHOD", by R. F. Antol, R. W. Kalkbrenner and R. M. Kobuck, Ser. No. 414,197;
(4) "GRID ASSEMBLY FIXTURE, RETENTION STRAP AND METHOD", by R. M. Kobuck and R. W. Kalkbrenner, Ser. No. 414,198;
(5) "LASER MACHINING SYSTEM", by D. L. Wolfe, J. W. Clements and J. S. Kerrey, Ser. No. 414,241;
(6) "MOVABLE MACHINING CHAMBER WITH ROTATABLE WORK PIECE FIXTURE", by R. F. Antol, R. Kalkbrenner and D. L. Wolfe, Ser. No. 414,263;
(7) "WORKPIECE GRIPPING AND MANIPULATING APPARATUS FOR LASER WELDING SYSTEMS AND THE LIKE", by R. Kalkbrenner and R. Kobuck, Ser. No. 414,262;
(8) "LASER LENS AND LIGHT ASSEMBLY", by R. Antol, R. Kalkbrenner and R. Kobuck, Ser. No. 414,205;
(9) "WELDING PLATES FOR A FUEL ROD GRID", by R. M. Kobuck, R. Miller, R. W. Kalkbrenner, J. Kerrey and R. Duncan, Ser. No. 414,265;
(10) "PLURAL COMPUTER CONTROL FOR SHARED LASER MACHINING", by J. W. Clements and W. D. Lanyi, Ser. No. 414,204;
(11) "GRID AND SLEEVES WELDING FIXTURE AND METHOD", by J. S. Kerrey and R. Duncan, Ser. No. 414,203;
(12) "CALIBRATION OF AUTOMATED LASER MACHINING APPARATUS" by J. W. Clements and J. R. Faulkner, Ser. No. 414,272; and
(13) "RIGID SUPPORT FOR LASER MACHINING APPARATUS", by D. L. Wolfe, Ser. No. 414,191.

BACKGROUND OF THE INVENTION

1. Field of the Invention

This invention, in its preferred form, relates to apparatus and methods for generating and directing pulses of a laser beam onto a work piece in a manner to ensure a strong weld of deep penetration. More particularly, this invention relates to apparatus and methods for welding a work piece by precisely controlling the lasing energy and in particular controlling the number of laser pulses imparted to the work piece. In an illustrative embodiment of this invention, the work piece takes the form of a nuclear fuel assembly, wherein its grid spacers are welded together at their points of intersection.

2. Description of the Prior Art

The precision laser welding apparatus of this invention relates generally to the manufacture of nuclear fuel bundle assemblies 10 as shown in FIG. 1 of the drawings. As shown, the nuclear fuel bundle assembly 10 is a self-contained unit comprised of a top nozzle assembly 12 and a bottom nozzle assemble 14, between which is disposed a matrix of nuclear fuel rods 18 arrayed in rows and columns and held in such configuration by a plurality of fuel rod grids 16. Though not shown in FIG. 1, control rods are included at selected positions within the array of nuclear fuel rods 18. The assemblies 12 and 14 and the fuel rod grids 16 provide a skeletal frame to support the fuel rods 18 and the control rods. The nuclear fuel bundle assemblies 10 are loaded into predetermined locations within a nuclear reactor and therefore, the orientation of the fuel rods 18 with respect to each other is rigorously controlled.

The precision laser welding apparatus of this invention is, in one illustrative embodiment thereof, related to the manufacture of fuel rod grids 16 as shown in FIGS. 2A to 2E. The fuel rod grid 16 is of an approximately square configuration, whose periphery is formed by four outer grid straps 22. Each end of an outer grid strap 22 is welded by a corner seam weld 30 to the end of a perpendicularly disposed outer grid strap. A plurality of inner grid straps 20 is disposed in rows and columns perpendicular to each other, whereby a plurality of cells are formed to receive the control rods and the nuclear fuel rods 18. The inner grid straps 20 disposed along the rows and columns have complementary slots therein at each of the points 24 of intersection for receiving a perpendicularly disposed inner grid strap 20. An intersect weld 32 is formed at each of the points 24 of intersection, whereby a rigid egg crate structure is formed. Further, each of the inner grids straps 20 includes at each end a pair of tabs 26 of a size and configuration to be tightly received in either a top or bottom row of slots 28 formed in the outer grid straps 22, as shown in FIG. 2A. A slot and tab weld 34 is effected along the top and bottom rows formed by the slots 28 within the outer grid straps 22. Further, a plurality of guide sleeves 36 is disposed on the sleeve side surface of the fuel rod grid 16 to receive and guide the control rods disposed therein. A series of notch seam welds 40 securely attaches the guide sleeves 36 to corresponding notches 38 formed within the inner grid straps 20. The precision laser welding apparatus of this invention is particularly adapted to perform a series of controlled welding operations whereby each of the welds 30, 32, 34 and 40 is carried out. The precision laser welding apparatus of this invention not only controls the various parameters of generating the laser in terms of the pulse width, the pulse height of each laser pulse, and the number of pulses to be applied to each weld, but also controls the sequential positioning of the fuel rod grids 16 with respect to the laser beam. It is understood that after each such weld, the fuel rod grid 16 is repositioned and/or the focal point of the laser beam changed to effect the particular type of weld desired.

Referring now to FIGS. 2B and 2C, the plurality of resilient fingers 44 is disposed longitudinally of the inner grid straps 20 in a parallel relationship to each other. A pair of spacing fingers 46 is disposed on either side of a corresponding resilient finger 44 and serves along with the resilient finger 44 to provide a resilient grip of the nuclear fuel rods 18 that are disposed within the cell formed by the intersecting inner grid straps 20. A resilient finger 44a is disposed to the right as seen in FIG. 2C in an opposing relationship to the spacing finger 46a, whereby a nuclear fuel rod 18 is resiliently held therebetween.

The manner of assembling the inner grid straps 20 to each other as well as to the outer grid straps 22 is shown in FIG. 2D. Each of the inner grid straps 20 includes a plurality of complementary slots 52. An upper grid strap 20a has a downwardly projecting slot 52a, whereas a lower grid strap 20b has a plurality of upwardly oriented slots 52b of a configuration and size to be received within a corresponding slot 52a of the inner grid strap 20a. At each end of the inner grid strap 20, there is disposed a pair of the tabs 26 to be disposed within corresponding slots 28 of an outer grid strap 22.

As will be explained in detail later, the inner grid straps 20 are welded to each other by the intersect welds 32 as formed of projection tabs 48 and tab portions 50a and 50b. More specifically, a projection tab 48 is disposed between a corresponding set of tab portions 50a and 50b when the inner grid straps 20a and 20b are assembled together. Upon the application of a laser beam to the tab 48 and tab portions 50a and 50b, an intersect weld 32 is formed that is rigidly strong and free of contamination in accordance with the teachings of this invention. Further, each end of an outer grid strap 22 has a corner tab 54. As shown in FIG. 2D, the outer grid straps 22c and 22b have respectively corner tabs 54b and 54c that overlap each other and are seam welded together to form the corner seam weld 30.

The vanes 42 project, as seen in FIGS. 2C and 2E, from a vane side of the fuel rod grid 16 to enhance the turbulence of the water passing over the nuclear fuel rods 18. Further, as illustrated particularly in FIG. 2C, the guide sleeves 36 are aligned with cells formed by the inner grid straps 20 that are free of either a resilient finger 44 or spacing finger 46, to thereby permit the free movement of the control rod through the cell and through the guide sleeve 36.

U.S. Pat. No. 3,966,550 of Foulds et al., and U.S. Pat. No. 3,791,466 of Patterson et al., assigned to the assignee of this invention, disclose similarly configured fuel rod grids of the prior art. Each of these patents discloses a fuel rod grid wherein the inner and outer grid straps are made of a suitable metallic alloy such as Inconel, and the above identified interconnections are effected by furnace brazing. However, the zirconium alloy Zircaloy is known to have the desirable characteristic of a low neutron absorption cross section which allows for more efficient use of the nuclear fuel in the utility operation and therefore allows for a longer elapsed time between refueling by the replacement of the nuclear fuel bundle assemblies. In particular, fuel rod grids made of Zircaloy have a lower absorption rate of the neutrons generated by the fuel rods than that absorption rate of straps made with Inconel. The making of the grid straps of Zircaloy requires at least several changes in the assembly of the fuel rod grids. First, it is necessary to make the slots, whereby the inner grid straps may intersect with each other, of looser tolerances in that grid straps made of Zircaloy do not permit a force fitting thereof, i.e. to be hammered into position, but rather require controlled fit-up to allow "push-fits" of the intersecting grid straps. In addition, Zircaloy grid straps may not be brazed in that heating Zircaloy to a temperature sufficient to melt the brazing alloy would anneal the Zircaloy, resulting in a loss of mechanical strength.

Prior to the selection of a particular method of welding, several different methods of welding volatile materials such as Zircaloy were investigated including continuous welding with a $CO_2$ laser, pulsed emission of a Nd:YAG laser, gas tungsten arc welding and electron beam welding. A pulsed electron beam is capable of power densities of up to $10^9$ watts/square centimeter with pulse widths in the micro-second and low millisecond range. However, welding with an electron beam is typically carried out in a vacuum environment which is relatively expensive to build and requires a relatively long time to establish the desired degree of vacuum therein, thus slowing down the manufacture of the fuel rod grids. Further, it is necessary to obtain relative movement of the work piece, e.g. the fuel rod grids, in three dimensions with respect to the electron beam which would require a very complex grid positioning system. The use of a continuous electron beam provides relatively low levels of power (in the order of 200 watts) requiring relatively long welding times and providing very shallow weld penetrations. The use of a gas tungsten arc was also considered and proved to be unacceptable for providing a sequence of welds in that after a given number, of welds, e.g. 25, the arc electrodes require sharpening to provide the desired fine arc to produce numerous well defined welds and to avoid damaging adjacent grid straps or vanes of the fuel rod grids. Two types of lasers are commonly used for welding applications: (1) the solid state Nd:YAG laser, as contemplated by this invention, which uses a crystal rod of neodynium doped yttrium-aluminum-garnet and (2) the $CO_2$ laser, which uses a mixture of $CO^2$—$N_2$—He as the lasing medium. An inherent advantage of the Nd:YAG laser is that its emission is in the order of 1.06 micron wave lengths, where glass is transparent to its laser emission. This characteristic permits the use of a coaxial microscope which uses the same optic elements for both optical viewing and laser focusing. Further, a pulsed Nd:YAG laser is capable of 400 watts of average power, of a pulse frequency of up to 200 pulses per second and of a peak power in excess of 8000 watts for up to 7 milli-seconds. Such high peak power permits the Nd:YAG laser to produce welds of relatively deep penetration, thus insuring the structural security of welded straps of the nuclear fuel rod grids. Such lasers may be operated either from a "cold start" with its shutter remaining open, whereby the weld time is determined by the length of time the power is applied to its flash lamps. Such a method of welding is not particularly applicable to a series of relatively rapid welds due to the laser rod warm-up time for each weld in the order of 0.8 seconds. Further, optical path length changes occur until a condition of thermal equilibrium is attained within the laser rod. A second method of operation, as contemplated by this invention, of the Nd:YAG laser permits the continuous pulse operation of the laser while using its shutter to "pick off" a fixed number of pulses, thus eliminating the effects of laser rod warm-up and ensuring a uniformity of welds even though a great number of such welds are being effected.

U.S. Pat. No. 3,555,239 of Kerth is an early example of a large body of prior art disclosing automated laser welding apparatus in which the position of the work piece, as well as the welding process, is controlled by a digital computer. Kerth shows the control of laser beams while controlling the work piece as it is moved from side to side along an X axis, horizontally forward and backward along a Y axis and vertically up and down along a Z axis. Typically, pulse driven motors are energized by the digital computer to move the work piece rectilinearly along a selected axis. In addition, the welding is carried out within a controlled atmosphere and, in particular, the pressure and flow of gas into the welding chamber is controlled by the digital computer. Further, a counter is used to count pulses, whereby the number of laser pulses applied to the work piece may likewise be controlled.

U.S. Pat. No. 4,263,495 of Fujita et al. discloses the use of a photodiode for receiving radiation from a weld site, i.e. the seam between two optical fibers, for measuring the power of the laser beam directed thereto during the course of the welding.

U.S. Pat. No. 4,088,890 of Waters discloses a programmable controller for controlling laser emission and, in particular, the control of a high beam shutter whereby the desired quantity of laser emission is directed onto the work piece. This patent also discloses the rectilinear movement of a carriage carrying the work piece along a vertical axis, whereby the work piece is successfully fully brought to a position where a laser weld is made. There is also disclosed the effecting of a seam weld, whereby the work piece is rotated while the laser beam is directed at a seam between two pieces to be welded together.

In particular, the Waters' patent discloses the use of a first set of lug sensors each disposed at the same level with respect to the vertical axis and 45° up stream of the laser welding head for defining the weld zone. In particular, the lug sensors provide a high output indicating the commencement of the welding zone and, in particular, a seam between two abutting lugs. It is understood that after the lugs are rotated past, the lug sensors detect a loss of laser reflection to indicate the passing of the trailing edges of the lugs. The rotation of the leading and trailing edges of the lugs past the lug sensors controls a shutter to direct laser emission onto the seam between the two adjacent lugs. A further set of level sensors are provided, whereby the work piece as carried by the carriage rectilinearly along the vertical axis is controlled to dispose the seam between adjacent lugs at a vertical position aligned with respect to the laser head. In particular, the level sensors detect a substantial reduction of the output of the reflected radiation as the seam between two lugs passes the level sensors, whereby the rectilinear movement of the carriage and its work piece along the vertical axis is stopped.

U.S. Pat. No. 3,858,025 of Sidbeck et al. discloses the use of two infrared sensors for assisting in the positioning of a work piece with respect to a welding tool in the form of a welding electrode. The work piece takes the form of two thin sheets disposed with respect to each other in a "T" relationship with the welding electrode being positioned to form a seam weld at the point of intersection between the two thin sheets. In particular, a pair of infrared sensors are disposed upon either side of the vertically disposed sheet of the work piece to sense any unbalance in the welding puddle heat. A suitable circuit is connected to the output of the infrared sensors to detect the unbalance and to drive a reversible motor in accordance with the sensed unbalanced to reposition the welding electrode.

The above-described sensing systems of the prior art are primarily related to seam welding, wherein the welding of a seam between two work pieces is controlled. In particular, the prior art has dealt with the initiating and terminating of a seam weld as well as the alignment of the seam with respect to a laser head. By contrast, this invention relates to the accurate alignment of a machining site in the illustrative form of a spot weld with respect to the laser path. As described above, the work piece to be welded takes the form of the fuel rod grid 16, wherein the machining sites comprise the points 24 of intersection between the inner grid straps 20, whereat intersect welds 32 are to be performed. As will be explained, if any of the points 24 of intersection is misaligned with respect to the laser path, the intersecting inner straps 20 will not be welded with respect to each other thus providing a defective grid. In addition, it is necessary to not only align one point 24 of intersection, but a plurality of such points 24. In this regard, means in the form of a pair of X and Y positioning tables are used to receive and to incrementally move the fuel rod grid 16 to each of a sequence of positions, whereby each of the points 24 of intersection is accurately aligned with respect to the laser path.

SUMMARY OF THE INVENTION

It is therefore an object of this invention to provide a new and improved apparatus and method for laser welding a work piece that will improve weld quality and in particular to ensure significant weld penetration and structural integrity of the work piece.

It is a further object of this invention to provide a new and improved apparatus and method for laser welding that is adapted to computer control to achieve a high rate of production of the work pieces to be machined.

It is a more specific object of this invention to provide a new and improved apparatus and method for laser welding that is readily adapted to achieve welding in an environment non-reactive to the material of which the work piece is made, while not unduly increasing the complexity or cost of such laser welding apparatus.

In accordance with these and other objects of the invention, there is provided apparatus and method for directing a controlled number of laser pulses onto a work piece to be machined. More specifically, the laser machining apparatus includes an excitable laser and an excitation lamp for continuously exciting the laser to emit a sequence of laser pulses. The application of the laser pulses to the work piece is controlled by an inner-cavity shutter that is opened to permit a precise number of pulses to be directed onto the work piece. The frequency (REP RATE) and pulse width of the laser pulses are controlled by the excitation lamp and, in turn, are set to create a progressive weld of significant depth and structural integrity. In an illustrative embodiment of this invention, the pulse width is set in the order of 3 to 9 ms and the frequency is set in the range of 15 to 25 pulses per second. The laser is excited to yield pulses of a peak power in the range of 2000 to 4000 watts, whereby an intersect weld of significant penetration is progressively created.

In a particular illustrative embodiment of this invention, the laser welding apparatus of this invention is adapted to weld two intersecting members, i.e. grid spacers of a nuclear fuel assembly, each such strap having a consumable projection tab, the tabs of the two members are aligned with each other, whereby the incident laser beam consumes the tabs of both members to form an intersect weld therebetween.

In the illustrative embodiment given above, the members are made of a material such as Zircaloy having a thickness in the order of 18 mils. For such parameters, the laser head is excited at a rate of 20 pulses per second, each pulse having a pulse width of 6 ms and a peak power of approximately 2600 watts. A weld penetration of at least 70 mils is achieved.

In a still further feature of this invention, there is provided control means illustratively in the form of a shutter control circuit for counting the number of laser pulses applied to a machining site of the work piece, whereby a known controllable quantity of energy is imparted to each site. To this end, the counting of the laser pulses begins after the completion of a laser pulse, whereby the actuation of the innercavity shutter is not synchronized to the computer but rather to the laser emission so that only whole laser pulses will be applied to the site. In this manner, the possibility of varying the number of pulses and thus the energy imparted to the site is avoided.

In an illustrative embodiment of this invention, a laser control circuit is provided for generating a series of timing signals of a selected frequency and pulse width to be applied to a counter of the shutter control circuit. The timing signals are generated in synchronism with the emission of the laser pulses and, in particular, serve to actuate a laser lamp for exciting the laser with bursts of radiation of the selected frequency and pulse width. The counter begins to count the timing signals upon the opening of the shutter and continues counting until reaching a number corresponding to that number of laser pulses to be directed onto the machining site, at which time the shutter is closed. The shutter opening is initiated by a signal which is applied to the shutter control circuit. The shutter control circuit is responsive to the initiate lasing signal to open the shutter after receipt of the next timing signal, whereby only whole laser pulses are directed by the shutter onto the machining site of the work piece. In an illustrative embodiment of this invention, the initiate lasing signal is developed by a mechanism for moving the work piece with respect to the laser beam and, in particular, when the moving mechanism has stopped moving the work piece with respect to the laser path, the initiate lasing signal is generated.

In a still further feature of this invention, a radiation sensitive means in the form of a photodiode is mounted with respect to the laser path to sense radiation reflected from a machining site of the work piece that has been aligned precisely with respect to the laser path. The output of the radiation sensitive device is analyzed during the course of the machining of a site to determine the rate of increase of the reflected radiation and if above a predetermined level, there is provided an indication that the laser path has been precisely aligned with respect to the site. In an illustrative embodiment of this invention, the radiation sensitive device output is applied to a sample and hold circuit that samples the output at controllable intervals to determine whether the output exceeds a minimum acceptable level that increases during the course of a machining step to provide an indication of site alignment with the laser path and therefore, whether the machining site is acceptable or not.

In a still further aspect of this invention, the laser lamp or lamps are continuously excited to emit pulsed radiation to the laser to thereby avoid repeated warm up times that would otherwise be incurred. The control of the application of the laser pulses to the work piece is provided by the innercavity shutter. In this manner, the laser is operating at a stable continuous level of excitation, whereby the energy level of the laser pulses as applied to the work piece is accurately controlled and a high rate of weld production achieved in that no laser rod warm-up time is needed.

BRIEF DESCRIPTION OF THE DRAWINGS

A detailed description of a preferred embodiment of this invention is hereafter made with specific reference being made to the drawings in which:

FIG. 1 is a perspective view of a nuclear fuel bundle assembly incorporating a plurality of grids made in accordance with the teachings of this invention;

FIGS. 2A–2E are respectively a perspective view, a plan view, a sectioned side view, a perspective exploded view, and a plan view of a fuel rod grid made in accordance with the teachings of this invention and incorporated into the assembly of FIG. 1;

FIG. 4 is a perspective, schematic representation of the laser system as incorporated into the precision laser welding apparatus for directing on a time shared basis a laser beam emitted from a single laser source to each of two work pieces, e.g. nuclear fuel rod grids;

FIGS. 8A and 8B are respectively graphical representations of the reflected energy from an intersect weld effected by pulse laser radiation aligned accurately and aligned inaccurately with an intersect weld;

FIGS. 9A and 9B are side views of one inner grid strap of an intersect weld that has been accurately and inaccurately aligned with the laser beam, respectively;

FIGS. 10A and 10B are a detailed circuit diagram of part of the circuitry of the shutter control system as generally shown in FIG. 5B, particularly illustrating that circuitry for counting the number of laser pulses directed onto the fuel rod grid 16 to be welded;

FIGS. 11A–G are graphical representations of signals developed at designated circuit points of the shutter control circuit shown in FIGS. 10A and 10B.

DESCRIPTION OF THE PREFERRED EMBODIMENT

The fuel rod grids 16 are comprised as described above of the inner and outer grid straps 20 and 22 that are assembled and welded together as shown in FIGS.

Figure 3A:
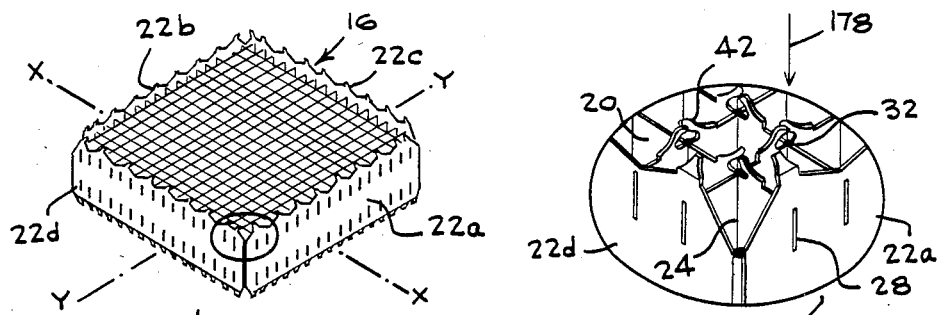
FIGS. 3A–3L show in a series of perspective views the sequence of steps for welding the nuclear rod grid as shown in FIG. 2.

2A to 2E. Each of the grid straps 20 and 22 is punched from a continuous roll of slit material and accumulates some surface oil in the punching operation. The oil film is cleaned and thereafter, the strap is annealed and then assembled into a work fixture as described in copending application entitled "GRID ASSEMBLY FIXTURE, RETENTION STRAP AND METHOD" U.S. patent application Ser. No. 414,198. Thereafter, the grid 16 and fixture are welded by the laser welding system 100 of this invention which carries out each of the intersect welds 32, the corner seam welds 30, the slot and tab welds 34, and the notch seam welds 40 in a pure atmosphere of an inert gas. Referring now to FIGS. 3A to 3L, the sequence of the welding steps in the inert gas is described in accordance with the teachings of this invention. The laser welding system 100 will be described in detail later; it is believed that an understanding of the manner in which the work piece, i.e. the fuel rod grid 16, is manipulated in each of three dimensions will facilitate an understanding of the operation of the laser welding system 100. As is apparent from these drawings, the fuel rod grid 16 is incrementally moved along its X and Y axes within a plane and is selectively rotated about its Y axis. Significantly, the aforementioned motion is carried out within a chamber wherein the atmosphere of the inert gas is maintained to a high degree of purity. The first step is illustrated in FIG. 3A, wherein the fuel rod grid 16 is disposed within the controlled atmosphere as formed by the welding chamber with its vanes 42 extending upwardly. A welding fixture is described in the copending application entitled "WELDING PLATES FOR A FUEL ROD GRID" U.S. patent application Ser. No. 414,265 whereby the inner and outer grid straps 20 and 22 are fixedly disposed with respect to each other during the welding operations. A vane suppressor fixture is a tool that is used for deflecting the vanes 42, whereby the vanes are fitted within the welding fixture; the vane suppressor fixture is described in the copending application entitled "STRAP AND VANE POSITIONING FIXTURE FOR FUEL ROD GRID AND METHOD" U.S. patent application Ser. No. 414,197. The atmosphere is purified by directing argon gas into the welding chamber until the desired degree of purity is reached, i.e. 10 ppm of water and 7 ppm oxygen. When the pure atmosphere has been established, the fuel rod grid 16 is moved in a series of incremental movements along the X and Y axes, whereby each of the points 24 of intersection between inner grid straps 20 is aligned with a laser beam 178 and thereafter, a controlled amount of energy is imparted thereto to effect the intersect weld 32. As will be explained in detail later, the laser beam 178 is provided by a pulsed Nd:YAG laser that is excited by pulsed excitation lamps energized by a calibrated reservoir voltage to deliver a specified level of energy to the grid 16. In particular, the number of pulses directed onto the point 24 of intersection of the inner grid straps 20 is controlled as shown in FIG. 3M, wherein six pulses of the laser beam are directed onto the work piece to form the intersect weld 32, each pulse having a pulse width of 6.2 ms, a rate of 20 pulses per second (pps), an average power of 350 watts, and a peak power of 2,580 watts. The intersect welds 32 are formed by turning on the laser beam 178 when the fuel rod grid 16 has been disposed in an aligned position with respect to the laser beam 178.

Figure 3B:
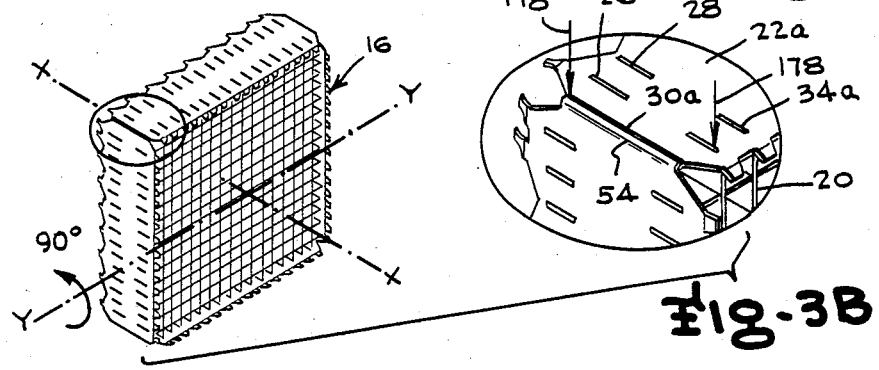

The next step is shown in FIG. 3B, wherein the fuel rod grid 16 is rotated about its Y axis 90° by a mechanism to be explained, whereby a first set of the slot and tab welds 34 and a first corner seam weld 30 are performed. These welds are seam welds which are carried out by moving the fuel rod grid 16 along its X axis while directing the laser beam 178 onto the work piece. In an illustrative embodiment of this invention, the slot and tab welds 34 are effected with a laser beam 178 of a pulse width of 2.2 ms, a pulse frequency of 50 pps, and an average of 350 watts, with the fuel rod grid 16 being moved at a rate of 30 inches per minute (IPM). FIG. 3B shows the relative position of the laser beam 178 to effect each of the slot and tab welds 34a and the corner seam weld 30a.

Figure 3C:
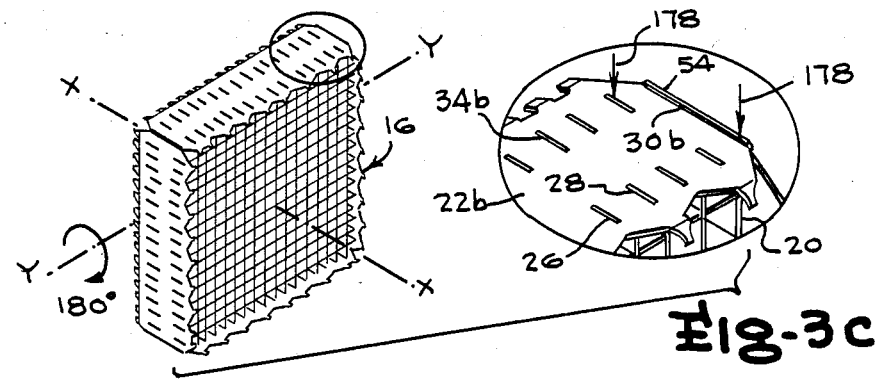
Figure 3D:
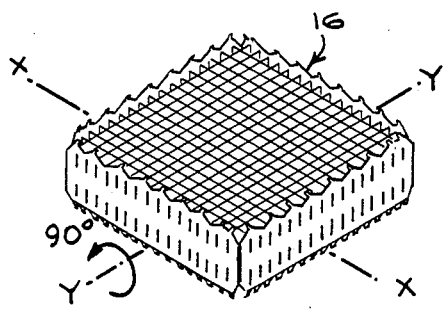

Next, as shown in FIG. 3C, the fuel rod grid 16 is rotated in a clockwise direction so that the opposing outer grid strap 22b is aligned with respect to the laser beam 178, whereby a second set of slot and tab welds 34b and a second corner seam weld 30b may be carried out. Thereafter, as shown in FIG. 3D, the fuel rod grid 16 is rotated 90° counter-clockwise to its original position as shown in FIG. 3A, and the fuel rod grid 16 and its weld fixture are removed from the welding chamber.

Figure 3E:
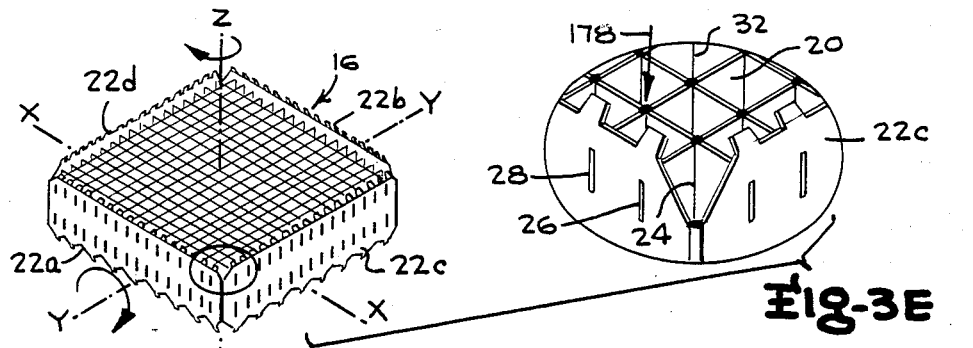
Figure 3F:
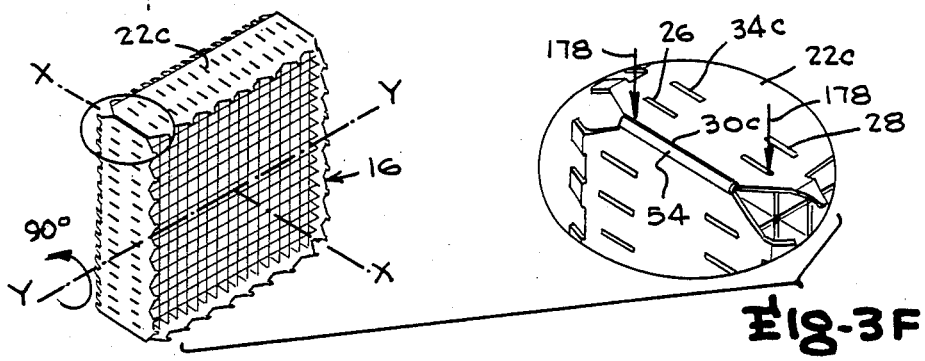
Figure 3G:
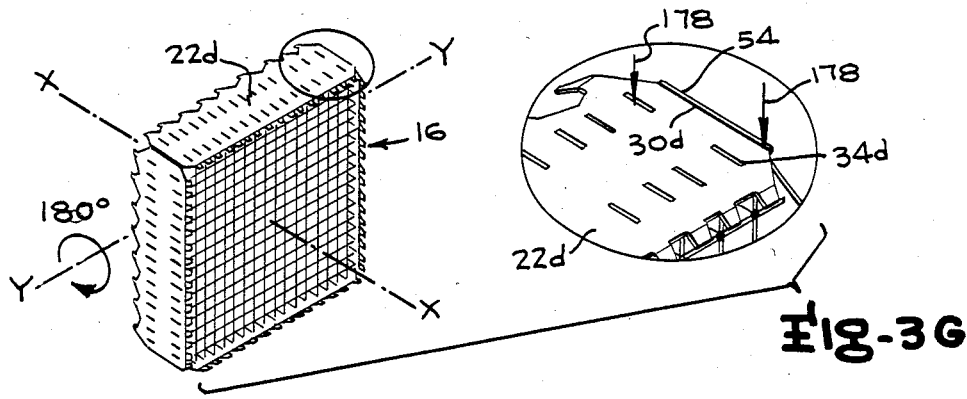
Figure 3H:
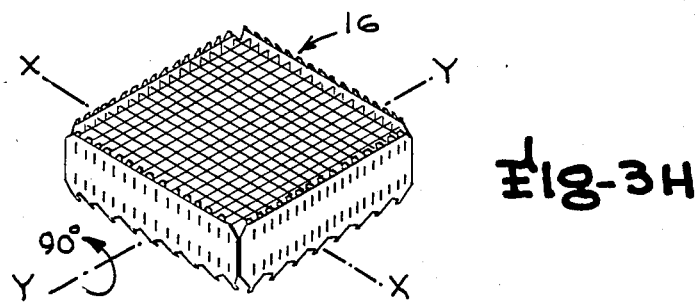
Figure 3I:
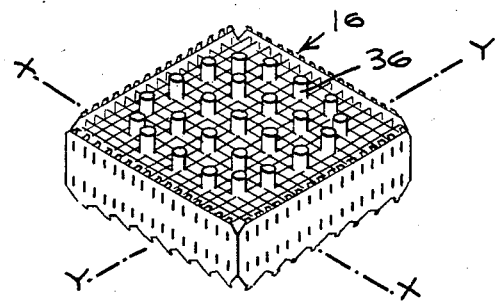

As shown in FIGS. 3E to 3H, a similar set of welding steps are carried out. After removal from the chamber, the fuel rod grid 16 and its weld fixture are turned over to dispose its vane side down and are rotated about its Z axes 90° in a clockwise direction so that the unwelded outer grid strap 22c faces the door of the welding chamber. The grid 16 and its weld fixture are locked into a secure position with respect to the welding chamber and the laser beam. Initially, the air within the welding chamber is purged with argon gas to an acceptable level of purity. Thereafter, as shown in FIG. 3E, the fuel rod grid 16 is incrementally moved through a series of steps along the X and Y axes, whereby each of the intersect welds 32 is effected as described above. After the completion of the intersect welds 32, the fuel rod grid 16 is rotated 90° in a counter-clockwise direction about its Y axis so that its outer grid strap 22c is brought beneath the laser beam 178, whereby a third set of slot and tab welds 34c is carried out and a third corner seam weld 30c effected. Next, as shown in FIG. 3G, the fuel rod grid 16 is rotated 180° about its Y axis to present the fourth outer grid strap 22d to the laser beam 178, whereby a fourth set of slot and tab welds 34d, and a fourth corner seam weld 30d may be carried out. Thereafter, in the step as shown in FIG. 3H, the fuel grid 16 is rotated 90° in a counter-clockwise direction to its original position before it and its weld fixture are removed from the welding chamber.

Figure 3J:
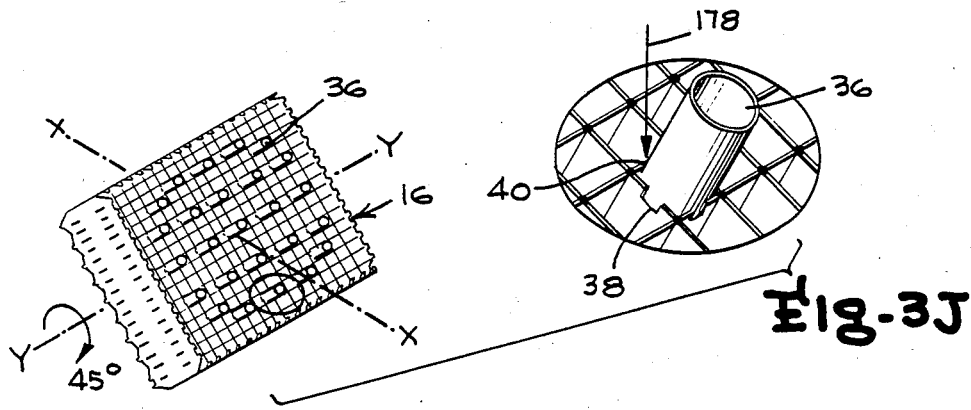
Figure 3K:
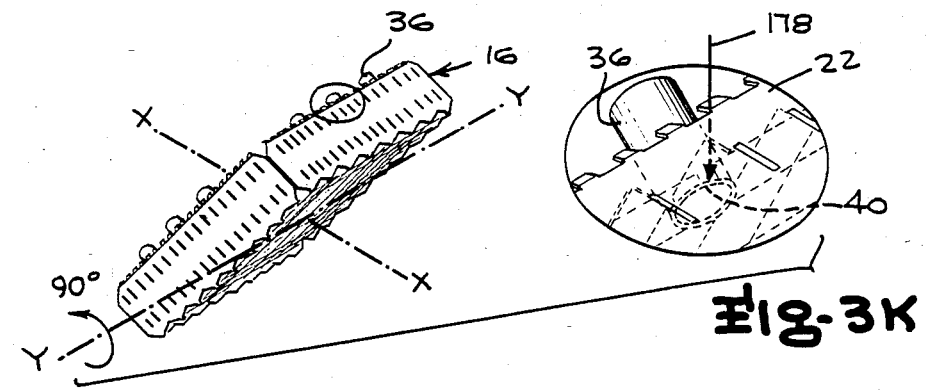
Figure 3L:
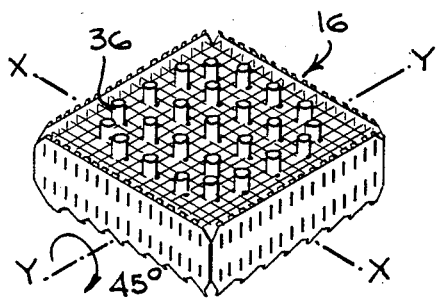
Figure 3M:
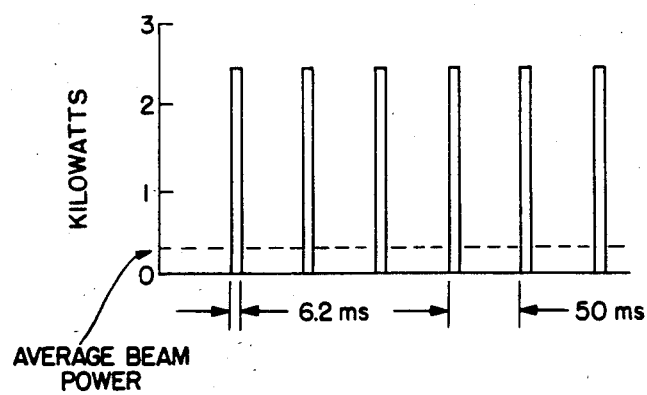
FIG. 3M is a graph showing a laser beam profile.

Referring now to FIGS. 3I to 3L, there is shown the process by which the guide sleeves 36 are welded to the fuel rod grid 16. Initially, the fuel rod grid 16 is removed from its welding fixture as required for the steps in FIGS. 3A to 3H, and placed into a sleeve welding fixture as described in the copending application, entitled "FUEL GRID WITH SLEEVES WELDED IN NOTCHED GRID STRAPS" U.S. patent application Ser. No. 414,232; the sleeve welding fixture includes a plurality of fixture pins disposed through selected of the cells formed by the inner grid straps 20 for receiving the guide sleeves 36, i.e. those openings having the notches 38 disposed in the peripheral edges thereof as seen in FIG. 3J. In particular, the fixture pins accurately position the grid sleeve 36 so that its axis is disposed centrally of the parallel with the surfaces of the inner grid straps 20. With the guide sleeves 36 accurately aligned and assembled with respect to the fuel rod grid 16, the grid 16 and its sleeve welding fixture are disposed into the welding chamber and affixed with respect to the chamber and to the laser beam 178. Thereafter, the air is purged with argon gas to the desired level of purity. Thereafter as shown in FIG. 3J, the fuel rod grid 16 is rotated 45° in a counter-clockwise direction and thereafter the grid and sleeve welding fixture are locked into that position at 45° with respect to the path of the laser beam 178 as shown in FIG. 3J. Thereafter, a series of notch seam welds 40 is carried out at a pulse width of 6.2 ms, at a pulse frequency of 20 PPS, an average power of 255 watts, and at a welding speed of 10 IPM. The fuel rod grid 16 is moved along the Y axis at the noted rate while the laser beam 178 is pulsed. As will be explained in detail later, it is necessary to refocus the laser beam 178 for each horizontal row of guide sleeves 36 as shown in FIG. 3J. A series of notch seam welds 40 is effected by moving the fuel rod grid 16 along its Y axis, bringing each guide sleeve 36 into position with respect to the laser beam 178, turning on the laser beam to effect the notch seam weld 40, and thereafter moving the fuel rod grid 16 to align the next guide sleeve 36. After a single horizontal row of guide sleeves 36 has been welded, the fuel rod grid 16 is moved along its X axis to position the next row of guide sleeves 36 in alignment with respect to the laser beam 178. Thereafter, it is necessary to refocus the laser beam 178 to effect the notch seam welds 40. As seen in FIGS. 3J and 3K, the guide sleeve 36 fits into four notches 38, and notch seam welds 40 are effected on opposing sides of the guide sleeves 36.

After one side of the guide sleeve 36 has been welded, it is necessary to rotate the grid 16 90° in a counter-clockwise direction as shown in FIG. 3K to expose the other, opposing notch 38 to the laser beam 178. After rotation, a series of notch seam welds 40 is carried out as explained above. Finally, in step FIG. 3L, the fuel rod grid 16 is rotated 45° in a clockwise direction to its original position before the grid 16 and its sleeve welding fixture are removed from the welding chamber to complete the welding steps of the fuel rod grid 16.

Referring now to FIG. 4, there is shown the laser welding system for controlling the series of welds and in particular the intersect welds 32, the slot and tab welds 34, the corner seam welds 30, and the notch seam welds 40 necessary to secure the inner and outer grid straps 20 and 22 together to form the fuel rod grid 16 and to secure the guide sleeves 36 to the grid 16 by controlling a laser system 102 to emit a laser beam 178 of controlled energy to successively and precisely position the grid 16, and to control the supply of a suitable inert gas, e.g. argon, in which to carry out the laser welding of the aforementioned welds. Each of the work pieces, e.g. the fuel rod grids 16, is successively moved to each of the weld positions by its positioning module as fully shown in copending application entitled "LASING MACHINING SYSTEM" U.S. patent application Ser.No. 414,241. In particular, a welding chamber 108 is associated with each of the positioning modules for receiving its grid 16 to establish an environment in which the laser welding may be carried out and, in particular, to establish an atmosphere of the inert gas while permitting movement of the grid 16 to effect the series of welds.

The laser system 102 shown schematically in FIG. 4 may, in one illustrative embodiment of this invention, take the form of that laser system manufactured by Raytheon under their model designation number SS500. The laser system 102 includes the laser rod 170 illustratively taking the form of a Nd:YAG crystal laser and a pair of linear krypton flash lamps disposed in a high efficiency laser head. The laser head includes a total reflecting mirror 182 and a partial reflecting mirror 184 disposed on either end of the laser rod 170. An inner-cavity shutter 188 is disposed between the laser rod 170 and the total reflecting mirror 182 and is selectively controlled to release a selected number of lasing pulses, whereby the energy imparted to effect laser welding may be precisely controlled in a manner to be explained below. The laser head is modularly constructed to permit all optic elements thereof including the laser rod 170, the excitation lamps 186 and the mirrors 182 and 184 to be easily and independently replaced. The excitation lamps 186 may be quickly replaced without disturbing the optical alignment. Further, the excitation or flash lamps 186 are water cooled over their entire length, including their end connectors. Lamp triggering provides for parallel pulsing of the excitation lamps 186 by energizing the cavity. The laser rod 170 shall illustratively be selected such that 400 watts average power is obtained at the work piece with the input power to the pulse forming network not to exceed 18 KW when operating at pulse widths of 6 ms and 2 ms and pulse rates of 20 Hz and 50 Hz respectively. A dump shutter 190 is disposable in a first position to direct the laser beam 177 along a diverted path 196 into a beam absorber 194 during those periods in which the work pieces in the form of the fuel rod grids 16 are being changed within the chambers 108. An actuating mechanism 192 is shown for disposing the shutter 190 from its first beam intercepting position to a second position, wherein the beam 177 is focused by a beam expander lens assembly 198 to a beam directing mechanism comprised of the movable beam switching mirror 172 and the stationary mirror 174. When the reflective mirror 172 is disposed to intercept the laser beam 177, it is diverted along path 178a to the vertically directing mirror 176a to be directed vertically. The laser focusing lens assembly 204a intercepts and focuses the laser beam 178a onto the fuel rod grid 16 within the chamber 108a. As shown, the laser focusing lens assembly 204, as will be described in detail later, includes a lens 202 and a lens carrier tube 200 as rectilinearly positioned by the Z-axis laser assembly 222. When the reflective mirror 172 is rotated by the motor 175 from a position intercepting the laser beam 177, it is diverted by the stationary reflective mirror 174 to form the laser beam 178b as directed by the vertically directing mirror 176b towards the welding chamber 108b.

The excitation lamps 186 are energized by a power supply illustratively comprising a voltage regulated DC powder supply which charges a pulse forming network (PFN) through a charging inductor. The related CNC 126 alternately closes switches (silicon controlled rectifiers) that charges the PFN from the DC power supply reservoir capacitator bank and discharges the PFN into the excitation lamps 186 to thereby excite the laser 170 to emit a series of laser pulses. The excitation lamps 186 shall operate in a "simmer" mode of operation, in which the lamps 186 are operated at a low DC current level below lasing threshold, and high current pulses are superimposed on the simmer current for generating laser pulses. The PFN shall provide pulses of 2 ms and 6 ms.

To assist in the initial alignment of the weld chamber 108 and, in particular, the fuel rod grid 16 with respect to the laser beam 178, there is provided means for sighting the grid 16 and, in particular, to determine its exact position with respect to laser beam 178 in the form of an alignment TV camera 206 that is aligned to establish an image path 214 coinciding with the path of the laser beam 178a. As shown in FIG. 6, the image path 214 is reflected by a stationary deflecting mirror 208, focused by a lens 210, selectively passed by a Bureau of Radiological Health (BRH) or safety shutter 212, and directed through the partially transmissive mirror 176 to the TV camera 206. The lens 292, in addition to focusing the laser beam 178 onto the fuel rod grid 16, also focuses with the assistance of lens 210 the image of the grid 16 onto the TV camera 206. As will be explained below, the laser focusing lens assembly 204 also includes an illuminating lamp that is selectively energized to illuminate the grid 16 for alignment purposes. The BRH shutter 212 is selectively opened and closed to permit alignment of the grid 16 with respect to the laser beam 178, remaining closed during all other periods as a safety measure.

As illustrated in FIG. 4, each of the welding chambers 108 may be moved from a first, welding position as shown in the dotted line to a second, out position. When the welding chamber 108 is in its second position, the laser beam 178 is directed by its vertically directing mirror 176 onto a power measuring device or thermopile 218, as supported within a shield tube 216. As will be shown later, the shield tube 216 is mounted on a rearward portion of the welding chamber 108 and includes a restricted opening 220 whereby the laser beam 178 may be effectively confined within the shield tube 216. Periodically, the welding chamber 108 is disposed to its second, out position and the laser beam 178 is directed onto the thermopile 218 to provide an indication of the power output of the laser 170 actually impinging onto the fuel rod grid 16. Under the heavy duty load imposed upon the laser system 102, it is contemplated that the laser efficiency will attenuate due to the exhaustion of the laser 170 and/or its excitation lamps 186, as well as due to the presence of smoke and debris given off during the laser welding. Thus, in order to provide accurate, reproducible welds, the voltage applied to the excitation lamps 186 is increased over the life of the laser system 102 dependent upon the thermopile measurements.

Figure 5A:
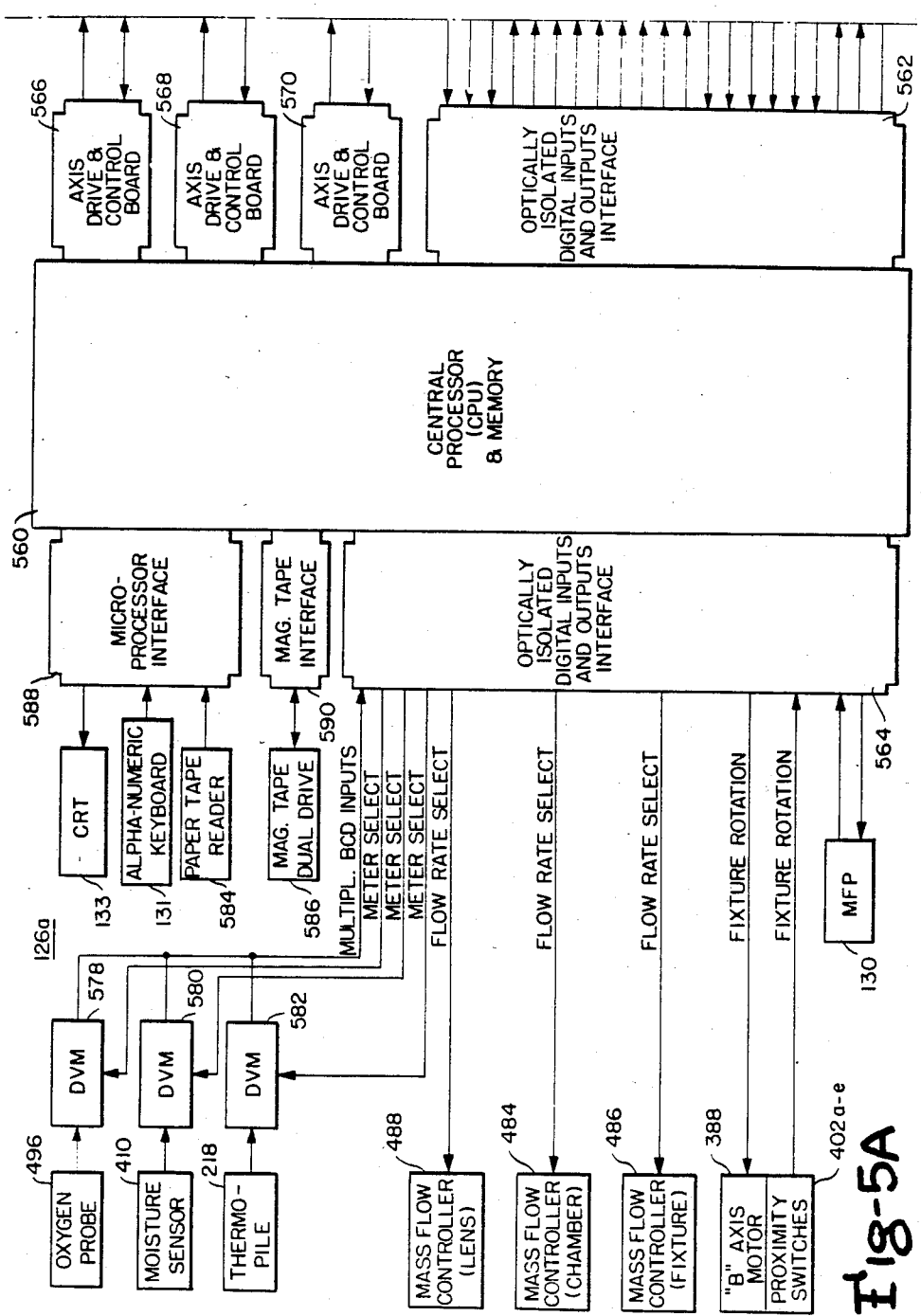
FIGS. 5A and 5B form a schematic diagram of the computer implemented control system for the laser welding system showing the relationship of the interface circuits with respect to the central processor unit (CPU) and memory, and to each of the chamber positioning mechanisms, of a second like computer control system, of the laser system.
Figure 5B:
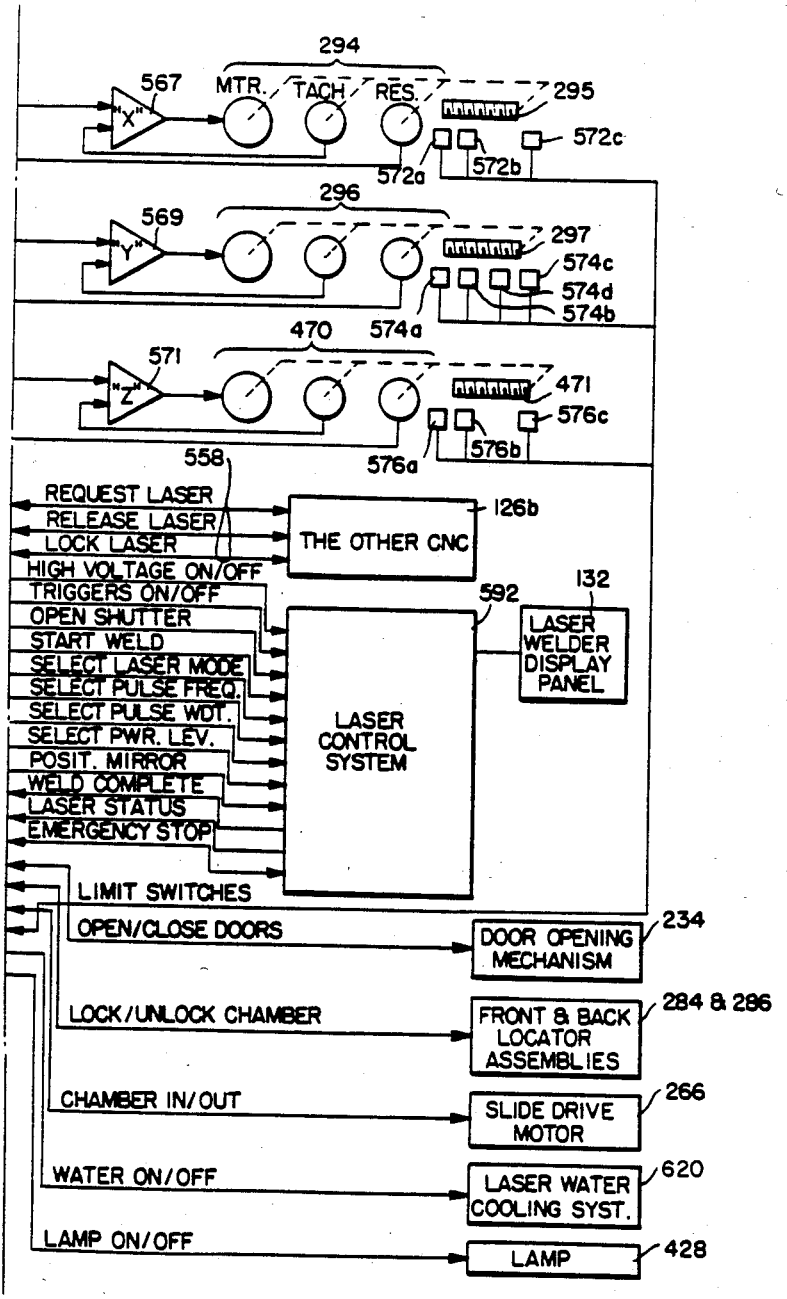

Referring now to FIGS. 5A and 5B, there is shown a functional block diagram of a computer control system and in particular of the first computer numerical control (CNC) 126a and the manner of its connection to the other CNC 126b represented only by a single block within the diagram. In this regard, it is understood that the other CNC 126b comprises the same elements as does CNC 126a, as shown in FIGS. 5A and 5B. The CNC 126a comprises a central processor unit (CPU) and memory identified by the numeral 560. In an illustrative embodiment of this invention the CNC 126 and in particular its CPU 560 may take the form of that computer as manufactured by the assignee of this invention under their model number 2560. The CPU 560 is provided with 64 K of core memory and is particularly adapted in its architecture and in its programming for machine control. It is understood that a standard 2560 CNC contains a basic supervisory software termed herein as either a main task loop system or operating program, which acts in the nature of an executive program to oversee the operation of the entire system. In the data structure as established within the model 2560 CNC, sets of codes, i.e. S, T, and M codes, are used to effect special or customized operations for which the 2560 CNC is readily adapted. In particular, a part program is programmed with the M, S, and T codes which call or bid subroutines termed herein application subroutines, whereby selected functions including the control of the argon flow and of selecting a particular welding mode are carried out. Further, the part program is programmed also with X, Y, and Z codes that control the movement imparted by the X and Y drive motors 294 and 296 to its work piece, and the Z drive motor 470 to the laser lens assembly 204, respectively. In particular, the X and Y codes designate the amount of movement or destination to which the work piece in the form of the fuel rod grid 16 is to be moved between welding steps. In like fashion, the Z code controls the amount of movement to be imparted to the laser lens assembly 204, whereby the laser beam 178 is focused upon the fuel rod grid 16. In particular, the Z codes are needed to effect the notch seam welds 40, wherein the rotatable fixture 242 is rotated out of its normal plane perpendicular to the laser beam 178 thereby necessitating the refocusing of the laser lens assembly 204. In addition, the memory of the CPU 560 has a special storage area known as the Part Program Storage Area, which is used to store the part program for execution by the operating system program. As will be explained, the part program basically designates the steps of the process of welding in a controlled, inert atmosphere and more specifically, is programmed with the M, S, and T codes, whereby the mode of welding and the rate of argon flow are effectively controlled. The Part Program Storage Area stores the part program as described below in FIG. 6 and those application routines as closely related to the subject invention are described in FIGS. 7A, B, and C. The part program is entered into the memory of the CPU 560 by a magnetic tape drive 586 via interface 590; in an illustrative embodiment of this invention, the magnetic tape drive 586 may take the form of that drive as manufactured by Qantex under its number 220. Alternatively, the part program can be stored on a paper tape and entered via a paper tape reader 584 via a microprocessor interface 588; illustratively, the paper tape reader 584 may take the form of that reader as manufactured by Decitex. Additionally, the micro-processor interface 588 also permits display of data messages upon a CRT 133. In addition, various parameters may be entered into the memory of the CPU 560 by the operator upon an alpha-numeric key board 131 via the interface 588.

As shown in FIGS. 5A and 5B, the CPU 560 is associated through a plurality of closed loop axis drive and control boards 566, 568 and 570 associated respectively with X and Y drive motors 294 and 296, and with a Z axis drive motor 470. It is understood that each of the drive motors is associated with its tachometer and resolver to provide an indication of the rate of travel, as well as the distance of travel, whereby extremely accurate control of the movement of corresponding X, Y and Z tables may be effected, as fully shown in the copending application entitled "LASER MACHINING SYSTEM" U.S. patent application Ser. No. 414,247. Though not shown in the drawings, it is understood that the X drive motor 294 is associated with an X table, whereas the Y drive motor 296 is associated with a Y table for respectively driving their tables and thus the welding chamber 108 and its work piece along X and Y axes with respect to the laser beam 178. In an illustrative embodiment of this invention, the X and Y tables, as well as their drive motors 294 and 296, are an assembled unit being mounted one upon the other for imparting the desired incremental movement in response to the output of the CPU 560. In similar fashion, the Z drive motor 470 is associated with a Z table, upon which the laser lens assembly 204 is mounted. As shown in FIG. 4, the laser lens assembly 204 is moved along the Z axis, whereby the laser beam 178 is focused upon the fuel rod grid 16. Further, the control output signal as derived from the control board 566 is applied to a servo amplifier 567 to be compared with a signal indicative of motor speed, to provide an output signal to actuate the X drive motor 294. As shown schematically, each of the motors 294, 296 and 470 is associated with a lead screw 295, 297 and 471 that effects drive of its corresponding X, Y, and Z tables. A set of limit switches 572 are associated with the lead screw 295 to sense the position of the lead screw 295 and therefore, its X positioning table 290 and to provide signals via an input and output interface 562 to the CPU 560. In particular, the limit switches 572a and 572c provide output signals indicative that the X positioning table has been disposed to its forward and rearward most limits of travel, whereas the limit switch 572b indicates that the X positioning table is disposed at its home position, whereat the X positioning table is disposed at its reference position with respect to the laser beam 178. A similar set of limit switches is associated with the lead screw 471 driving the Z axis table. As set of limit switches 574a, b and c is provided with the lead screw 297 driving the Y table; a fourth limit switch 574d is associated with the lead screw 297 for detecting when the Y positioning table has been disposed in its center position, i.e. that position at which the welding chamber 108 may be removed from its cabinet.

As seen in FIGS. 5A and 5B, a host of peripheral devices are associated with and controlled by the CPU 560 by optically isolating interfaces 562 and 564. In particular, the other CNC 126b interchanges a set of "handshaking" signals via a CNC link 558 and the interface 562 with the CPU 560, whereby each of the CNC's 126a and 126b may bid for and obtain control of the beam switching mirror 172 in a time shared fashion. As explained in the copending application entitled "PLURAL COMPUTER CONTROL FOR SHARED LASER MACHINING" U.S. patent application Ser. No. 414,204 each of the two CNC's 126a and 126b may bid for and subsequently control the beam switching mirror 172 to direct the laser beam 178 into its welding chamber 108. After use, the CNC 126 generates a release laser signal, whereby the other CNC 126 may request and subsequently lock the laser for its own use.

The laser system 102 may in one illustrative embodiment of this invention take the form of that laser system as manufactured by Raytheon under their model number SS500 and comprises a laser power supply, as well as a laser control system 592 that is coupled by the interface 562 to the CPU 560. As shown in FIGS. 5A and 5B, the laser control system 592 is coupled to a laser welding display panel 132. The laser welding display panel 132 includes an array of lamps and pushbuttons that control and display the condition of the laser system 102 and its control system 592 as fully described in the copending application entitled, "LASER MACHINING SYSTEM" U.S. patent application Ser. No. 414,241.

As seen in FIGS. 5A and 5B, the CPU 560 provides control signals via the optically isolated interface 562 to actuate the laser control system 592. In particular, interface outputs are applied to the laser control system 592 to turn on or off the high voltage output of the power supply, to enable the laser lamp triggers, to dispose the innercavity shutter 188 and the BRH safety shutter 212 to their open positions, to initiate the welding process, to select a particular mode of laser welding depending on one of the codes M51 through M54, to set the pulse frequency (REP RATE) as derived from the T code, to set the power level as derived from the S code, to set the pulse width, and to position the beam switching mirror 172. Signals are developed by the laser control system 592 indicative of the completion of a weld as well as the laser status to be applied via the optically isolated interface 562 to the CPU 560. Upon generation of emergency stop signals, the operations of the laser welding system 102 and in particular of the laser control system 592 may be stopped in an emergency.

Figure 2D:
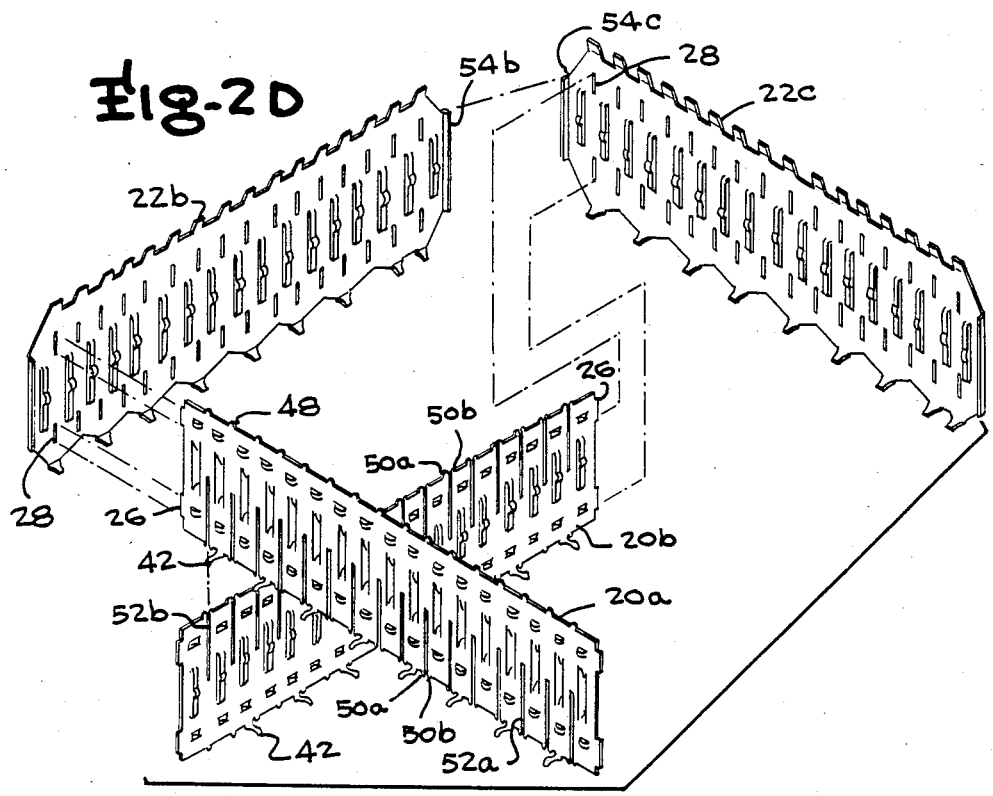
Figure 2E:
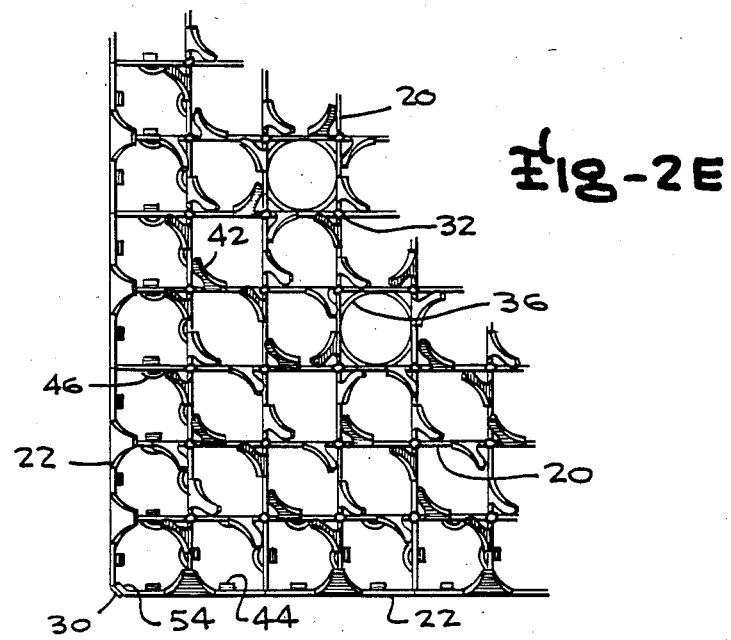

As shown in FIG. 5B, an open shutter signal is applied by the optically coupled interface 562 to the laser control system 592, whereby the pulse laser beam 178 is directed onto the fuel rod grid 16. Significantly, a selected, whole number of pulses is applied to the grid 16, whereby a controlled amount of energy is imparted to each weld thus ensuring not only weld consistency but the structural integrity of each weld. As will become evident, a series of laser pulses as shown in the graph of FIG. 8A gradually increases the temperature of the weld site, thus producing a sound weld of significantly deep penetration. Experiments have demonstrated the superiority of applying a series of pulses, as opposed to applying a single continuous pulse. A single laser pulse of equal energy has the tendency to render the weld site molten, whereby the molten material tends to unevenly run. As shown in FIG. 2D, the inner grid strap 20b has a pair of consumable tab portions 50a and 50b, whereas inner grid strap 50a has a single tab 48. When the grid straps 20a and 20b are fully interconnected with each other, i.e. the slot 52a of the grid strap 20a is fully inserted within the complementary slot 52b of the grid strap 20b, the consumable tab portions 50a and 50b are disposed on either side of the projection tab 48. As contemplated by this invention, a controlled number of laser pulses of the beam 178 is directed onto the tab 48 and tab portions 50a and 50b to produce the spot or intersect weld. Tests have proven that if but a single pulse is directed on the tab 48 and tab portions 50a and 50b, that the tab portions become quickly molten and the molten metal tends to run into but a single quandrent as formed by the intersecting inner grid straps 20. By contrast, a series of laser pulses controlled as to frequency, to pulse width, and to average and peak power produce a progressive weld whose penetration increases controllably with receipt of each laser pulse. As suggested in FIG. 8A, each pulse as represented by a vertical temperature peak tends to increase the average temperature of the weld site with a slight relaxation of cooling of the weld site between pulses. The weld site temperature steadily increases until the last laser pulse is delivered, after which there is a significant decrease in weld site temperature.

Various combinations of laser pulse frequency (or REP RATE) and pulse width have been attempted and it has been found that a frequency in the order of 15 to 25 pulses per second (PPS) with each pulse having a width in the order of 3 to 9 ms and a peak power in the order of 2000 to 4000 watts will produce a structurally sound spot weld, as shown in FIG. 3M. In an illustrative embodiment of this invention, the inner grid straps 20 are made of a thickness in the order of 18 mils of the zirconium alloy zircaloy, and the laser pulses are emitted at a rate of 20 (PPS), each pulse having a width of 6 ms and a peak power of 2580 watts to provide a weld penetration depth of approximately 70 mils. It has been found that if the above suggested rate is decreased below approximately 15 PPS, that the peak power delivered to the weld site increases above 4000 watts with resultant splatter of the molten material, whereas if the rate is increased above 25 pulses per second that the peak power goes below the 2000 watt level and that the resultant weld penetration becomes too shallow to provide a structurally sound weld. Variations of the pulse width of the laser beam beyond the specified limits produces undesired results; for example, if the pulse width is decreased below approximately 3 ms, the beam tends to cut as opposed to weld the machining site. On the other hand, if the pulse width exceeds 9 ms there is a tendency to quickly turn the projection tab 48 and tab portions 50a and b into molten metal that does not evenly distribute itself about the weld site. As suggested above, the laser 170 may illustratively take the form of a Nd:YAG laser, which is readily operated at the illustrative parameters and within the noted ranges suggested above in accordance with the teachings of this invention.

Figure 10A:
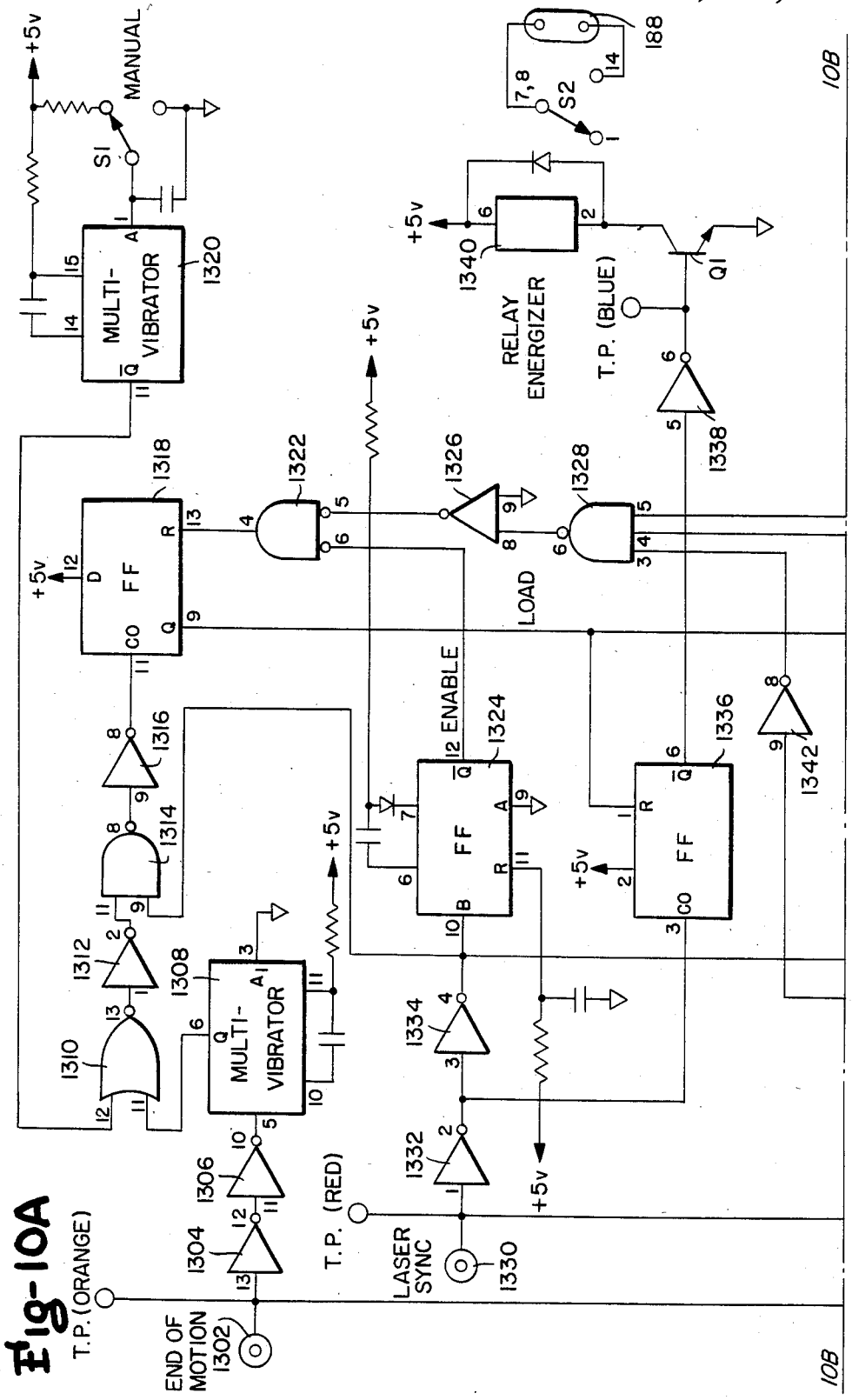

Referring now to FIGS. 10A and B, there is shown a shutter control circuit 1300 for ensuring that the innercavity shutter 188 is actuated to permit lasing so that only a whole number of pulses of the laser beam 178 is directed onto the fuel rod grid 16. In this manner, the amount of energy imparted to each weld by the laser beam 178 may be accurately controlled; otherwise, it is contemplated that the shutter 188 could be operated to be opened or closed to permit only a part or fraction of a pulse to be emitted, whereby it would be impossible to precisely control the amount of power imparted to each weld. To this end, the laser control system 592 includes a module control circuit for setting the lasing parameters in terms of frequency and pulse width of the voltage applied to the excitation lamps 186 associated with the laser 170, whereby the emitted laser pulse is controlled to effect each of the intersect welds 32, the corner seam welds 30, the slot and tab welds 34, and the notch seam welds 40. Each such module includes switches for setting the pulse width and frequency of the laser pulses, whereby a laser sync signal, as shown in FIG. 11A, is developed of the selected frequency and pulse width, and is applied via an input terminal 1330 to the shutter control circuit 1330. In particular to laser sync signal is applied via a pair of inverters 1332 and 1334 to an enabling flip flop 1324 and via the inverter 1332 to clock a positive going flip flop 1336. The laser sync signal is applied also by the inverter 1334 to the clock input of each of a set of up/down counters 1334, 1346 and 1348. As shown in FIG. 10B, each of the counters 1344, 1346 and 1348 is associated with a corresponding one of a set of switches 1354, 1356 and 1358, whereby the operator may set the desired number of pulses to be counted and thus applied to the fuel rod grid 16. In particular, there is included a units switch 1354, a tens switch 1356 and a hundred switch 1358. Upon counting to that count as entered by its switch, an output is derived from each of the up/down counters 1344, 1346 and 1348 and applied to a NAND gate 1328. After each of the counters 1344, 1346 and 1348 has reached its set count, a high going signal is applied to each of the inputs of the NAND gate 1328, forcing its output low. The low output is inverted by an inverting amplifier 1326 and applied to an AND gate 1322. The flip flop 1324 is set on the positive going edge of the first pulse of the laser sync signal to apply an enable signal to the other input of the AND gate 1322, whereby a reset signal is applied to the positive edge triggering flip flp 1318. The clock output Co of each of the up/down counters 1344, 1346 and 1348 is applied to one input of a NAND gate 1350, the other input being provided by the load output of the flip flop 1318 as shown in FIG. 11D, to apply the sequence of those pulses being counted by the counters 1334, 1346 and 1348 to a "pulse count" output as shown in FIG. 11F.

The counters 1344, 1346 and 1348 are not enabled to begin counting the laser sync signal until the welding chamber 108 and its fuel rod grid 16 have been brought to a halt. More specifically, a signal indicative of the "End of Motion" is developed after the X drive motor 294 and the Y drive motor 296 have completed their movements of the corresponding X and Y tables upon which the welding chamber 108 is mounted. The end of motion signal as shown in FIG. 11C is applied via inverters 1304 and 1306 to a multivibrator 1308, which provides a single output pulse via a NOR gate 1310, and an inverting amplifier 1312 to one input of a NAND gate 1314. The other input to the NAND gate 1314 is derived from the output of the inverter 1334 corresponding to the laser sync signal. The NAND gate 1314 applies an output upon the occurrence of the next pulse of the laser sync signal via an inverter 1316 to the clock input Co of the positive edge triggering flip flop 1318, which in turn provides the "load" output signal upon its Q output, as shown in FIG. 11D. As shown in FIG. 10A, the "load" signal is applied to the reset input R of the positive edge triggering flip flop 1336, as well as to the reset input R of each of the up/down counters 1334, 1346 and 1348 to permit these counters to begin counting of the laser sync signal applied to their input clock terminals Co. The functioning of the flip flop 1336 is significant to this invention in that the flip flop 1336 controls the actuation of the innercavity shutter 188 to permit only a whole number of the laser pulses to be directed onto the fuel rod grid 16. As seen by comparing FIGS. 11B and 11D, the flip flop 1336 is reset by the "load" signal that is generated after the application of the "end of motion" signal. As shown in FIGS. 11A and 11E, an output is derived from the flip flop 1336 upon the occurrence of the negative going edge of the next pulse of the laser sync signal. The relay actuating signal as derived from the $\overline{Q}$ output of the flip flop 1336 is applied via an inverter 1338 to render conductive a transistor Q1, whereby a relay 1340 is energized, thus closing switch S2 to energize the inner-cavity shutter 188 to its open position, wherein the pulses of the laser beam 178 are directed onto the work piece. As shown in FIG. 11E, the inner-cavity shutter 188 is only opened after the occurrence of the trailing edge of a pulse of the laser sync signal, i.e. only a whole number laser pulses is applied to the fuel rod grid 16. As explained above, a count is manually entered by the switches 1354, 1356 and 1358 into their corresponding counters 1344, 1346 and 1348. When that count has been reached, the NAND gate 1328 is actuated to thereby reset the flip flop 1318, whereby the "load" signal is removed from the reset input R of the flip flop 1336. Upon the occurrence of the trailing edge of the next timing pulses, the signal derived from the output $\overline{Q}$, as shown in FIG. 11E, goes high, whereby the relay energize signal, as shown in FIG. 11G, is removed, thus closing the inner-cavity shutter 188. Noting that the laser sync signal serves to synchronize the energization of the laser 170, this signal is also counted by the counters 1344, 1346 and 1348 to control the opening and closing of the inner-cavity shutter 188 to permit only a whole number of the laser pulses to be directed onto the work piece.

The shutter control circuit 1300 of FIGS. 10A and 10B is capable of operating in an independent test mode and in particular includes first and second timers 1362 and 1366 for developing test timing signals of frequencies of 20 PPS and 70 PPS, respectively. As shown in FIG. 10B, the timing of each timer is set by the particular resistors and capacitors connected thereto. The timing signals are applied respectively via NAND gates 1360 and 1364 via a selectively closed one of the switches S3 or S4 to the input terminal 1330. The selected timing signal is used in place of the laser sync signal and is similarly applied via the inverters 1332 and 1334 to the flip flop 1324 thus providing the enable signal and to the clock input Co of each of the counters 1344, 1346 and 1348, and via the inverter 1332 to the flip flop 1336. In the test mode, the operator simulates the initiate or end of motion signal by throwing a switch S5, whereby a single output pulse as developed by a timer 1370 is applied via the NAND gate 1368, the closed switch S5 and the multivibrator 1308 to the clock input Co of the flip flop 1318 to thereby initiate the counting of the selected timing signal by the counters 1344, 1346 and 1348. By the use of the noted timers, the shutter control circuit of FIG. 10 may be tested independently of any signals as developed by the laser control system 592. In a further test capability, there is provided a multivibrator 1320 that is selectively actuated by a manual switch S1 to apply a test pulse via the NOR gate 1310, the inverter 1312, an enabled NAND gate 1314 and an inverter 1316 to the clock input Co of the flip flop 1318 to initiate counting as well as to manually energize the relay 1340 and to open the inner-cavity shutter 188. This manual capability of supplying a triggering pulse from the multivibrator 1320 is particularly useful when the shutter control circuit 1300 is coupled to the laser control system 592 and it is desired to manually open the inner-cavity shutter 188.

Further, signals are developed by the CPU 560 and are transmitted by the optically isolated innerface 562 to control a door opening mechanism 234 to either open or close the doors covering the welding chambers 108. Signals are applied to lock or unlock the welding chamber 108 and, in particular, are applied to each of front and back locator assemblies 284 and 286. The front and back locator assemblies 284 and 286 are fully disclosed in the copending application entitled "MOVABLE MACHINING CHAMBER WITH ROTATABLE WORK PIECE FIXTURE" U.S. patent application Ser. No. 414,263. In particular, the front and back locator assemblies 284 are associated with a slide table for moving the X and Y tables referred to above and the welding chamber 108 mounted thereon from a first welding position to a second, out position. In FIG. 4, the welding chamber 108a is disposed in the first welding position, wherein the laser beam 178a is directed onto the work piece 16; by contrast, the welding chamber 108b is shown in its out position, wherein the welding beam 178b is directed into the thermopile 218 for calibration purposes. In particular, the front and back locator assemblies 284 and 286 position the slide table to dispose the welding chamber 108 fixedly and accurately in its first welding position with respect to the laser beam 178. The output signals as derived from the sets 572, 574 and 576 of limit switches are applied to the interface 562. Signals are also applied to a laser water cooling system 620. The laser flash or excitation lamps 186 and the cavity as defined by the mirrors 182 and 184 are cooled by the closed loop water cooling system which provides clean, pure, temperature-regulated water at the required pressure and flow rate. Though not shown, it is well understood in the art that the water cooling system includes a pump, a water-to-water heat exchanger, a reservoir, a deionizer, a filter, and a temperature regulator. Heat from the laser rod 170 and the beam absorber 194 is discharged to the water and removed from the system. In addition, a control signal is applied to a lamp 428 of the laser lens assembly 204, to illuminate the fuel rod grid 16, whereby the X–Y positioning system 288 may be adjusted along either the X or Y axis to align the starting point of the fuel rod grid 16 with respect to the laser beam 178.

Inputs are provided from an oxygen probe 496 and a moisture sensor 410 that are disposed with respect to the welding chamber 108 to provide analog signals indicative in parts per million of the oxygen and water within the welding chamber atmosphere. In similar fashion, the thermopile 218 as disposed with a shield tube 216 provides an analog signal indicative of the power of the laser beam 178 directed therein. The outputs of each of the probe 496, the sensor 410, and the thermopile 218 are applied to corresponding digital volt meters 578, 580, and 582, which convert the input analog signals to corresponding digital signals to be applied via the optically isolated interface 564 to the CPU 560. The interface 564 provides appropriate meter select signals to each of the digital volt meters 578, 580, and 582 to selectively apply only one digital signal at a time via the interface 564 to the CPU 560. Depending upon the operation of the laser system 102, the CPU 560 applies signals via the optically isolated interface 564 to each of a plurality of mass flow controllers 488, 484, and 486 to control the rate of argon flow respectively to the laser lens assembly 204, a rotatable fixture 242 for mounting the fuel rod grid 16 within the welding chamber 108. The rotatable fixture 242 is briefly shown in FIG. 4 and is fully disclosed in the copending application entitled "MOVABLE MACHINING CHAMBER WITH ROTATABLE WORK PIECE FIXTURE" U.S. patent application Ser. No. 414,263. The rotatable fixture 242 permits the fuel rod grid 16 to be rotated to an angular position with respect to the Z axis and the laser beam 178, and to permit welding of the notch seam welds 40, as well as the corner seam welds 30 and the slot and tab welds 34. Signals are applied to the B axis motor 388, whereby the positioning wheel 358 and the rotating fixture 242 may be rotated. As explained above, the angular position of the rotating fixture is sensed by a plurality of proximity switches 402a-d to provide a binary signal that is applied by the interface 564 to the CPU 560.

The process of welding the inner grid straps 20 together and in turn to the outer grid straps 22 and the resultant grid 16 to the guide sleeves 36 has been described above with respect to FIGS. 3A to 3K; in these figures, there is illustrated the series of movements of the fuel rod grid 16 in each of its X, Y, and Z axes to appropriately position the fuel rod grid 16 with respect to the laser beam 178, whereby each of the intersect welds 32, the corner seam welds 30, the slot and tab welds 34, and the notch seam welds 40 may be effected. The inner and outer grid straps 20 and 22 are assembled to form the fuel rod grid 16 as explained in the copending application entitled "STRAP AND VANE POSITIONING FIXTURE FOR FUEL ROD GRID AND METHOD" U.S. patent application Ser. No. 414,197 and "GRID ASSEMBLY FIXTURE, RETENTION STRAP AND METHOD" U.S. patent application Ser. No. 414,198. Next, the fuel rod grid 16 is disposed upon a welding fixture, which is described in the copending application entitled "WELDING PLATES FOR A FUEL ROD GRID" U.S. patent application Ser. No. 414,265; the welding fixture in turn is releasably affixed by locating pins to the rotatable fixture rotatably disposed within the welding chamber 108. As explained above, the fuel rod grid 16 may be rotated about its B axis to dispose the fuel rod grid 16 in position to receive the laser beam 178 to effect the notch seam welds 40. The X and Y positioning tables are actuated in a sequence of incremental steps along their X and Y axes to position the fuel rod grid 16 with respect to the laser beam 178, whereby the intersect welds 32 are effected, and after rotation upon the rotatable fixture, the slot and tab welds 34 and the corner seam welds 30 are effected.

Figure 6A:
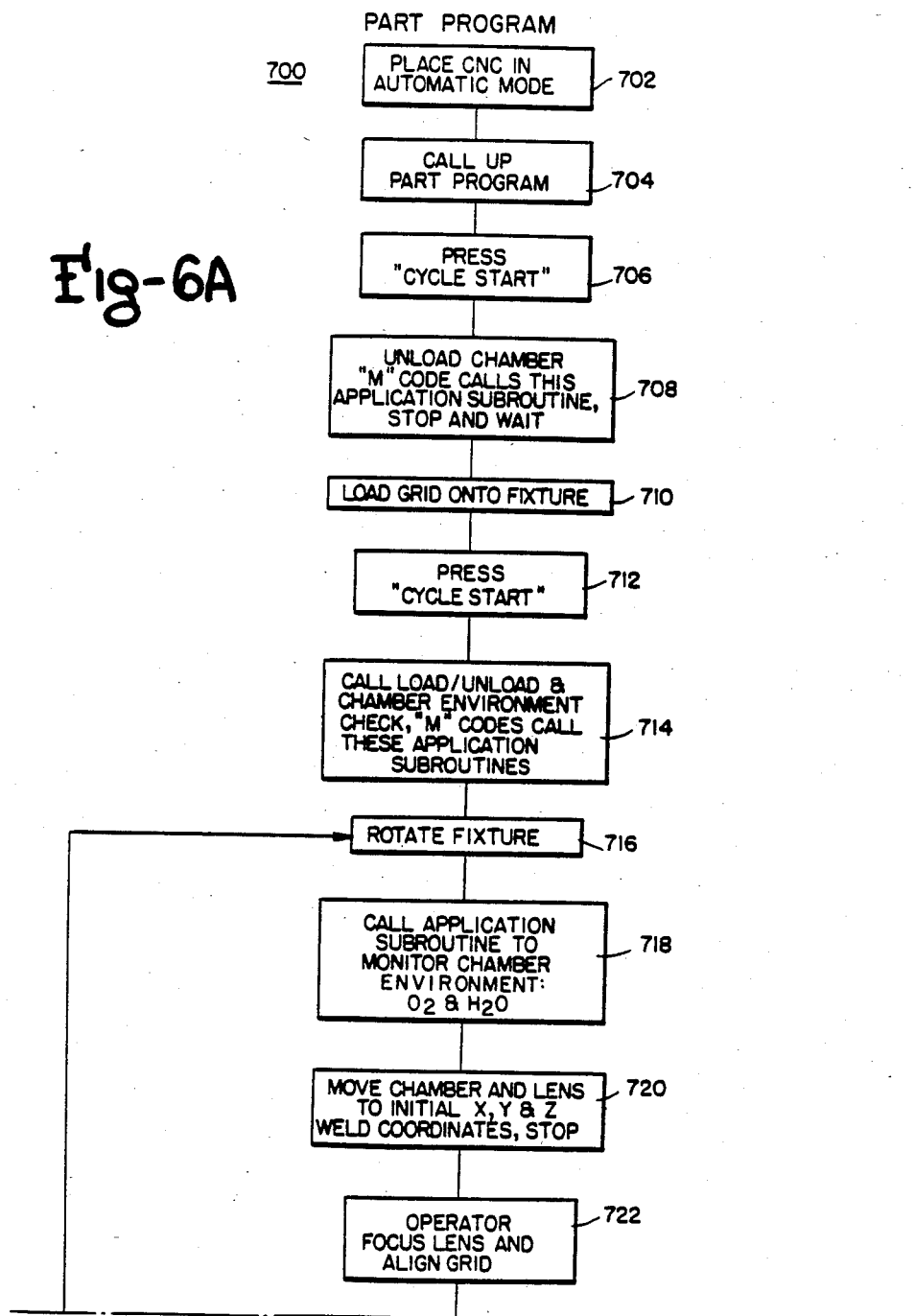
FIGS. 6A and 6B are a high level flow diagram of the part program illustrating the steps of the control process whereby the laser welding system is controlled to effect a series of welds of the nuclear rod grid in a precise fashion.

The machine control for this process is provided by the CNC 126 and in particular by the CPU 560 which includes a memory for storing the part program 700, which will now be described with respect to FIGS. 6A and 6B. The part program 700 is entered when in step 702, the operator places the CNC 126 in its automatic mode by pressing an AUTO pushbutton on the machine function panel 130. Next, the operator enters a command on the alphanumeric keyboard 131 panel to call the part program for execution. Next, the operator presses the CYCLE START pushbutton 658. Next, in step 708, a programmed M81 code calls a LOAD/UNLOAD CHAMBER application subroutine to effect the actuation of the slide drive motor 266 to drive the slide table from its first welding to its second, out position (see the position of the welding chamber 108b in FIG. 4), whereby an operator may load an assembled, though not yet welded fuel rod grid 16 and its welding fixture onto the rotatable fixture. The fuel rod grid 16 and its welding fixture are locked by the locating pins in a predetermined position with respect to the laser beam 178. In step 710, the operator loads the fuel rod grid 16 into the welding chamber 108, with the assistance of the load/unload manipulator as described in the copending application entitled "WORKPIECE GRIPPING AND MANIPULATING APPARATUS FOR LASER WELDING SYSTEMS AND THE LIKE" U.S. patent application Ser. No. 414,262. At the end of step 708, the execution of the part program is suspended until in step 712, the operator presses CYCLE START pushbutton on the machine function panel 130 to recommence the execution of the part program. Next, step 714 calls the LOAD/UNLOAD application subroutine to reload the chamber 108 into its first or welding position beneath the laser beam 178. Once repositioned, an M code is used to call the CHAMBER ENVIRONMENT CHECK application subroutine, before the welding chamber 108 is purged of impurities such as oxygen and water by introducing argon at a relatively high rate in a bottom portion of the welding chamber 108, whereby the heavier argon displaces the air driving it out through that spacing between a chamber's upper flange 331 and a sealing plate (not shown). The particular argon flow rate is set by an M code, whereby the mass flow controller 484 is set to provide a high rate of flow to the welding chamber 108. In similar fashion, the mass flow controllers 486 and 488 associated with the rotatable fixture 242 and the laser lens assembly 204 are set to a higher flow rate to hasten the purging of the welding chamber 108. The particular M code calls the SELECT GAS FLOW RATE application routine. Next, step 716 of the part program sets the M91 codes to effect rotation of the rotatable fixture 242 and in particular to actuate the B axis rotation drive 238 to effect rotation of the fixture and its grid 16 within the welding chamber 108. In particular, the M91 code as executed by step 716 bid the ROTATE FIXTURE application subroutine. Step 718 serves to initiate or bid the CHAMBER ENVIRONMENT CHECK application subroutine to monitor the environment within the welding chamber 108 as to its oxygen and water content and to prevent the further execution of the part program until the levels of oxygen and water are below predetermined levels.

After step 718 has determined that the environment within the welding chamber 108 is sufficiently pure, step 720 responds to X and Y codes to controllably drive the X and Y positioning tables, whereby the initial weld to be made is positioned along the Z axis coinciding with the laser beam 178. The initial welding position is identified by a set of X and Y codes which are interpreted to provide appropriate control signals to the X and Y drive motors 294 and 296. In similar fashion, a Z code is interpreted and control signals are applied to the Z axis drive motor 470, whereby the laser lens assembly 204 is positioned to focus the laser beam 178 onto the initial weld of the fuel rod grid 16. After completion of these steps, step 720 brings the part program to a stop. In step 722, the operator may manually control by appropriate actuation of an X IN pushbutton, an X OUT pushbutton, a Y LEFT pushbutton and a Y RIGHT pushbutton (as mounted on the machine function panel 130), position the X and Y positioning tables, whereby the initial weld of the fuel rod grid 16 is precisely aligned with respect to the laser beam 178. To this end, the BRH safety shutter 212 is opened permitting the operator to view the grid image as displayed upon the CRT 133 and obtained from the alignment TV camera 206. The lens of the camera 206 has an electronic recitical by which the operator may align the initial weld precisely with respect to the laser beam 178. In similar fashion, the operator manipulates a Z UP pushbutton and a Z DOWN pushbutton of the machine function panel 130 to control the movement of the laser lens assembly 204 to precisely place the laser lens 202, whereby the laser beam 178 is focused onto the fuel rod grid 16.

In order to reinitiate the execution of the part program, the operator in step 724 presses the CYCLE START pushbutton. Next, in step 726, the part program calculates the differences between the X and Y coordinates of the initial weld position and of the aligned position, i.e. the new grid position after being aligned in step 722, the differences being known as the X and Y offsets. Similarly, the difference between the initial home position along the Z-axis and the focused position of the laser lens assembly 204 provides a Z offset. The X, Y, and Z offsets are stored in a designated area in memory and are used by the CNC 126 to calculate the precise position of each weld taking into account the adjusted or offset position of the fuel rod grid 16.

Next, step 728 sets the various parameters of the laser system 102 and, in particular, programs the S, T, and M codes that determine the power level, the pulse frequency, the pulse width, and the type of weld, i.e. which of the intersect weld 32, the corner seam weld 30, the slot and tab weld 34, and the notch seam weld 40, to be performed. In particular, the power level of the laser system 102 is determined by an S code which is serviced by a SERVICE S CODE application subroutine. In similar fashion, the pulse frequency is set by a T CODE which is serviced by the SERVICE T CODE application subroutine. The pulse width is set by one of the M CODES M55–M60 corresponding to widths of 1 to 6 ms, which bid the execution of the SET LASER PULSE WIDTH application subroutine. In similar fashion, there are four types of welds corresponding to the M codes M51 through M54, which bid the execution of the SET LASER MODE application subroutine. Next, step 730 sets by use of one of the M CODES M61 through M64 the particular argon flow rate that is required for a welding operation and in particular bids the SELECT GAS FLOW RATE application subroutine. Next, in step 732, the set one of the M codes M51 through M54 bids the PERFORM LASER WELD application subroutine. Generally, the PERFORM LASER WELD application subroutine first requests or bids for the use of the laser via the GET LASER application subroutine, whereby the other CNC 126b is checked by examining the REQUEST LASER and LOCK LASER outputs of the other CNC 126b and if present, the CNC 126a waits until the appearance of a RELEASE LASER output from the other CNC 126b, at which time the CNC 126a requests and thereafter locks the laser for its use. Upon obtaining the use of the laser system 102, the CNC 126a disposes the beam switching mirrors 172 to direct the laser beam 178 to its welding chamber 108. Thereafter, the positions of the X and Y positioning tables are checked to see if they have come to rest in their proper position and a positioning time out period is permitted to expire, before firing the laser rod 170. Then, step 732 waits for a LASING COMPLETE signal indicating that the welding step has been completed before releasing the beam switching mirror 172 and commanding the X and Y drive motors 294 and 296 to move the fuel rod grid 16 to its next position in preparation for performing the next in a series of welds. Next, step 736 decides whether the particular type of weld as set by one of the M codes M51 through M54 has been completed and if not, the part program returns to step 732 to perform the next weld and then in step 734, to move the fuel rod grid 16 to its next weld position. Thereafter, step 735 determines whether the M code M88 has been programmed to bid for the WAIT FOR OTHER CNC application subroutine, whereby a signal is transmitted to the other CNC 126b to indicate that a series of welds has been completed and then to wait for a response from the other CNC 126b; during this interval, the part program execution is suspended.

After a particular type of weld has been completed, the part program moves to step 738 where the part program stops and examines which of the M codes M51 through M54 has been programmed to determine the next type of weld. Thereafter, in step 740, a decision is made as to whether all of the types of welds necessary to complete the welding of at least one side of the fuel rod grid 16 have been made and if not, the part program returns to step 716, whereby the sequence of steps 716 through 738 is repeated. The first sequence of welding steps as illustrated in FIGS. 3A to 3D is carried out on the vane side of the nuclear fuel rod grid 16 before it is then necessary to remove the fuel rod grid 16 from its welding chamber 108 to be rotated and returned to the welding chamber 108. In step 742, the laser system 102 is turned off by sending a signal to dispose the dump shutter 190 to a position as shown in full line of FIG. 6 to direct the laser beam 177 into the laser absorber 194.

Thereafter, step 744 sets the M code M82 to bid for the LOAD/UNLOAD CART application subroutine, whereby the slide drive motor 266 is actuated to direct the slide table to its second, out position, whereby the fuel rod grid 16 may be removed from the welding chamber 108. At this point, the operator brings the manual manipulator to remove the fuel rod grid 16 and its welding fixture from the welding chamber 108 to perform those manual operations in preparation for the next sequence of welding steps. For example, after the intersect welds 32 on the vane side of the fuel rod grid 16 are completed as in the steps shown in FIGS. 3A to 3D, the fuel rod grid 16 is removed and rotated so that the intersect welds 32 as appearing on the opposite or guide sleeve side of the fuel rod grid 16 may be completed as seen in the steps of FIGS. 3E to 3H. After the intersect welds on both sides of the fuel rod grid 16 have been completed, the grid 16 is removed and the guide sleeves 36 are inserted therein, before effecting the notch seam welds 40 as shown in the steps 3I to 3L.

Figure 6B:
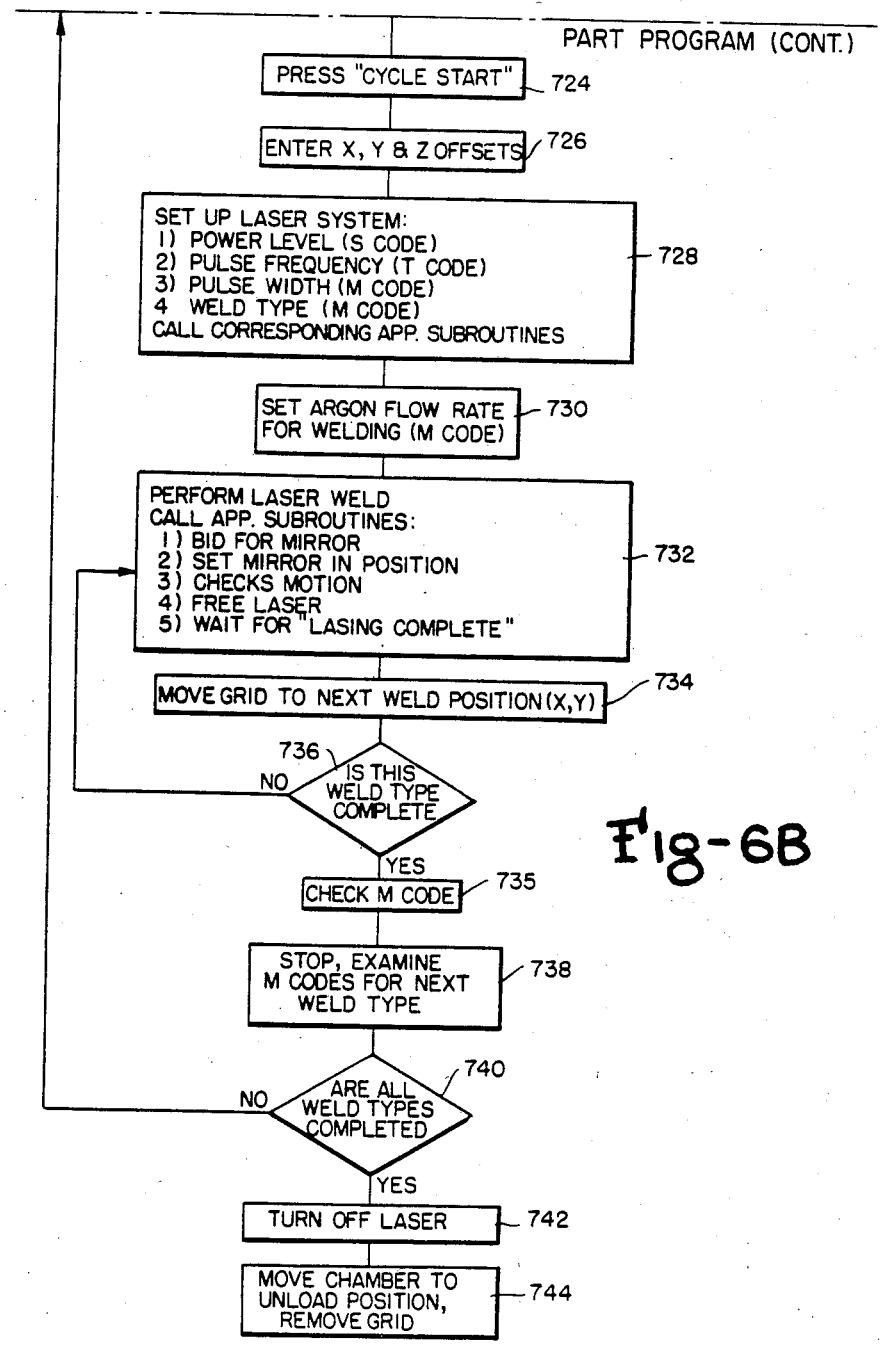
Figure 7A:
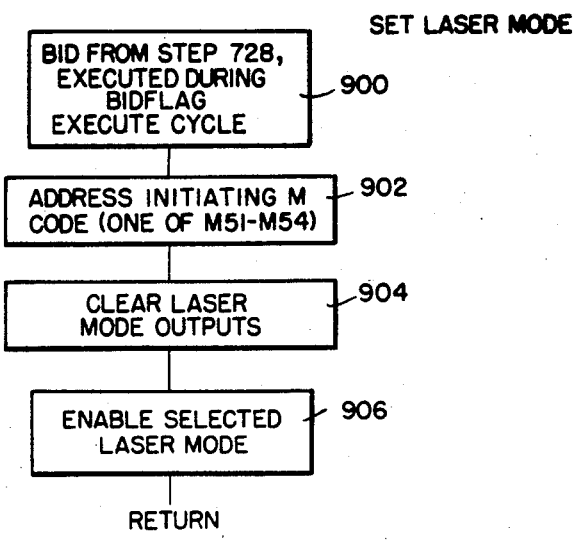
FIGS. 7A, B and C are application subroutines that are bid by M, S, and T codes set in part by the part program as illustrated in FIGS. 6A and 6B, and are flow diagrams respectively of the SET LASER MODE, SET LASER PW and PERFORM LASER WELD application subroutines.

FIG. 7A shows the SET LASER MODE application subroutine that is bid from step 728 of the part program shown in FIG. 6B and is executed during the Bidflag Execute Cycle of the main task loop of operating system program. The SET LASER MODE application subroutine determines which of the four laser modes corresponding to the four different types of welds made upon the fuel rod grid 16 is to be selected. As shown in FIG. 2A, there are four different types of welds, namely the intersect welds 32, the corner seam welds 30, the slot and tab welds 34, and the notch seam welds 40. As explained above, the laser system 102 illustratively taking the form of a model number SS500 as manufactured by Raytheon, comprises four distinct modules or hard wired circuits for controlling each of the four types of welds, as to the number of pulses and/or the time interval during which the pulse laser beam 178 is directed onto the fuel rod grid 16. Illustratively, each of these modules has thumb wheel switches to permit the setting of the number of pulses or time period in which the laser beam 178 is directed onto the work piece. Each module and its weld type is assigned one of the codes M51 through M54. In step 902, one of these modules is addressed according to its code. In step 904, the laser mode output as appears on the SELECT LASER MODE terminal of the optically isolated interface 562 is cleared. Finally, step 906 applies the selected mode via the SELECT LASER MODE OUTPUT to the laser control system 592 to select the desired module for the particular type of weld. As will be explained later, the pulse width and the frequency or REP RATE are selected in accordance with programmed M and T codes.

Figure 7B:
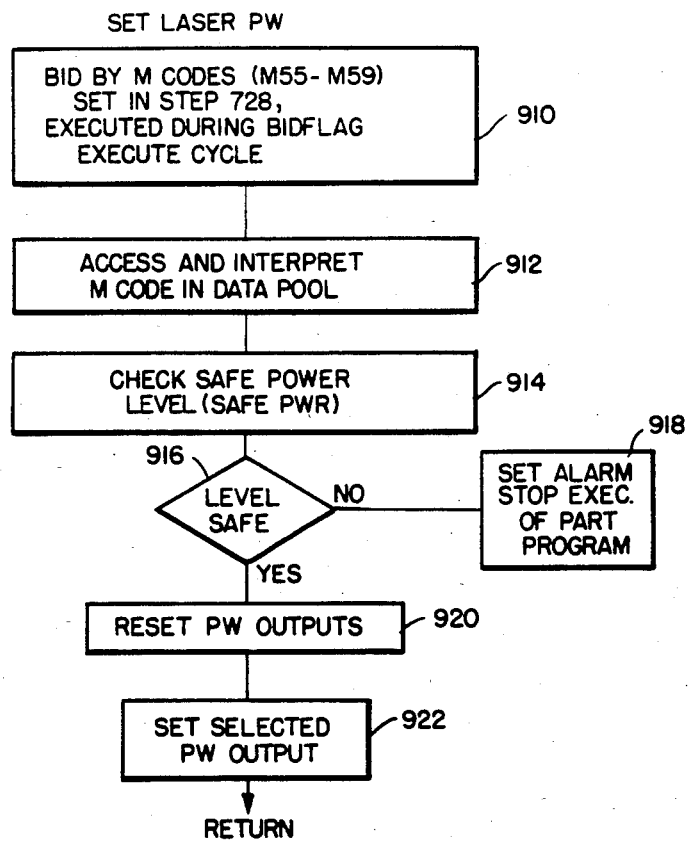

Referring now to FIG. 7B, the SET LASER PULSE WIDTH application subroutine is shown. Initially in step 910, this application subroutine is entered by setting one of the M codes M55 through M59 dependent upon the selected one of possible five laser pulse widths in step 728 of the part program shown in FIG. 6B, and is executed subsequently during the next Bidflag Execute Cycle Step 912 which interprets and accesses the selected M code in the data pool of the memory of the CPU 560. Step 914 checks the safe power level of the laser beam 178 as calculated with the selected pulse width by bidding the SAFEPWR application subroutine. Step 916 determines whether the calculated power level is safe, i.e. less than maximum limits, and if not, step 918 sets an alarm whereby an immediate stop to the part program is effected. If safe, step 920 resets the SELECT PULSE WIDTH OUTPUT of the interface 562, and step 922 sets the SELECTED PULSE WIDTH OUTPUT, whereby the laser control system 592 sets the desired pulse width of the laser beam 178. In this regard, it is noted that only one of the parent and other CNC's 126 may set the pulse width, with the other CNC 126 adopting the pulse width as set by the selected or PRIME CNC 126. As will be explained in greater detail with regard to the copending application entitled "PLURAL COMPUTER CONTROL FOR SHARED LASER MACHINING" U.S. patent application Ser. No. 414,204, one of the two CNC's 126 is designated as the PRIME CNC and in effect controls the pulse width and frequency of the pulsing of the laser control system 592 of the other CNC. However, each CNC 126 selectively controls the reservoir voltage or output voltage from its laser power supply, whereby an individual adjustment may be made of the power level of the laser beam 178 as applied to the welding chamber 108 associated with each CNC 126. Since each welding chamber 108 is effecting a similar type of weld, a single CNC 126 designated as PRIME selects the pulse width and REP RATE, whereas an individual adjustment of the reservoir voltage or RESVOLT is desired to permit individual adjustment of each of the laser beams directed to each welding chamber 108 for the different conditions of the separate optical paths, laser lens assemblies 204 and welding chambers 108.

Figure 7C:
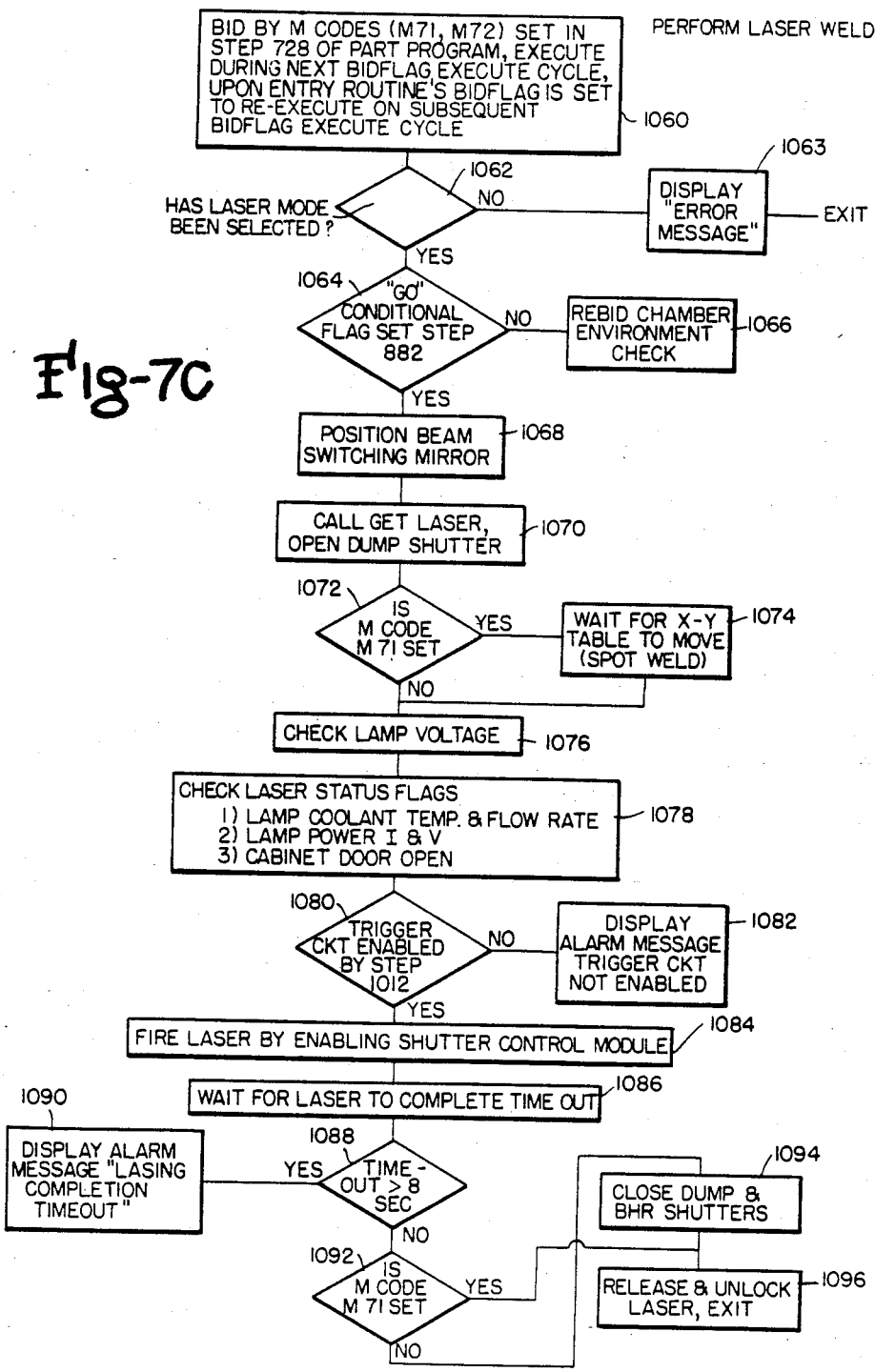

The PERFORM LASER WELDS application subroutine is shown in FIG. 7C and is bid by the M codes M71 and M72 as set in step 728 of the part program and executed during the next Bidflag Execute Cycle. Upon entering in step 1060, the application subroutine Bidflag is set to execute on the subsequent Bidflag Execute Cycle. After entering, step 1062 determines whether one of the laser modes corresponding to one of the codes M51 through M54 has been selected. As explained above, the laser control system 592 includes four separate modules, each hard wired and programmed to control one of the intersect welds 32, slot and tab welds 34, corner seam welds 30 or notch seam welds 40. If no, step 1063 displays an "ERROR MESSAGE" routine. If yes, step 1064 checks to determine whether the GO flag had been previously set in step 882 of the CHAMBER ENVIRONMENT CHECK application subroutine. If not, the step 1066 rebids the CHAMBER ENVIRONMENT CHECK application subroutine to again determine whether the atmosphere within the welding chamber 108 has been purified so that its oxygen and water content is below the specified limits. If yes, step 1068 actuates the beam switching mirror 172 to direct the laser beam 178 to the welding chamber 108 of this CNC 126. Thereafter, the dump shutter 190 is disposed to its open position, whereby the laser beam 177 is directed into the selected welding chamber 108. Thereafter, step 1072 determines whether the M code M71 has been set. As indicated above, there are two M codes, i.e. M72 and M72, the code M71 indicating that a spot weld, corresponding to the intersect welds 32, is to be performed, whereas an M72 code indicates that a seam weld corresponding to the corner seam welds 30, the slot and tab welds 34, and the notch seam welds 40, is to be effected. A seam weld differs from a spot weld in that the fuel rod grid 16 is moved by the X and Y drive motors 294 and 296 while the laser rod 170 emits a series of pulses of the laser beam 178, whereas a spot weld is effected with the fuel rod grids 16 being kept stationary with respect to the laser beam 178. Thus, if an M71 CODE is detected, indicative that a spot weld is to be performed, step 1074 effects a delay to wait for the X and Y drive motors 294 and 296 to come to a halt before causing the laser rod 170 to fire. On the other hand, if an M72 CODE is programmed, indicating that a seam weld is to be performed, no delay is imparted thus permitting the laser rod 170 to initiate welding before the movement of the fuel rod grid 16 begins. Next, step 1076 checks to determine whether the voltage applied to the excitation lamps 186 is as programmed. Thereafter, step 1078 checks the status of the laser and in particular determines whether the temperature and flow rate of the lamp coolant are within specified limits, whether the current and voltage of the lamp power are within specified limits, and whether the cabinet door 114 is open.

Thereafter, step 1080 determines whether the lamp trigger circuits have been successfully triggered by step 1012 of the SET LASER POWER LEVEL OFFSET application subroutine. If not set, step 1082 displays an alarm message "Trigger Circuit Not Enabled" on the CRT 133. If enabled, step 1084 effects laser firing by enabling the shutter control module of the laser control system 592, i.e. applies the start weld signal thereto. Step 1086 initiates the timing of a delay period during which the laser rod 170 is programmed to complete its lasing, i.e. waits to receive the weld complete signal from the laser control system 592. Step 1088 determines whether a period of eight seconds has expired and if not expired, displays a message "Lasing Completion Time Out" on the CRT 133. After timing out, step 1092 determines whether a spot weld is to be performed, i.e. has the M CODE M71 been set, and if so, the subroutine moves to step 1096 wherein the CPU 560 generates via the optical interface 562 a Release Laser Signal on the CNC link 558 indicating that the laser rod 170 has been released and that the other CNC 126b may now request the laser. If a seam weld has been performed, step 1094 closes the dump shutter 190 and the safety BRH shutter 212, before exiting in step 1096.

Referring now to FIG. 4, there is shown an alignment detector 183 for determining whether each machining site 191 of the work piece in the form of the fuel rod grid 16, i.e. each point 24 of intersection, is aligned with the laser beam 178a. The alignment detector 183 comprises a radiation sensitive device in the form of a photodiode 185 that is sensitive to not only the visual range of radiation, but also to infrared radiation, and a lens 187 for focusing the radiation reflected from the machining site 191 along a reflected path 189 and onto the photodiode 185. The output of the photodiode 185 is coupled to a machining site alignment detection circuit 1400 as shown in FIGS. 12A, B, and C. The alignment detector 183 also includes a tubular housing 193 for mounting the photo diode 185 and its lens 187.

Illustratively, the tubular housing 193 is mounted upon the tube housing 200 of the laser lens assembly 204 in a manner such that the reflected path 189 from the machining site 191 is aligned with the photodiode 185, when the laser beam 178a is precisely aligned with respect to the point 24 of intersection between the inner grid straps 20, i.e. the machining site 191. In such an illustrative embodiment, the alignment detector 183, as well as the laser lens assembly 204, may be removed from its welding chamber 108 to permit the welding chamber 108 to be moved between its first and second positions. In an illustrative embodiment of this invention, the tubular housing 193 may be comprised of a tube having an outer diameter in the order of ¼" inch and an inner diameter of ⅛", for receiving the photodiode 185 and the laser lens 187 separated from each other by a distance in the order of 3" to 4". When in use, the laser lens assembly 204 and the alignment detector 183 are moved to a position such that the bottom most edge of the alignment sensor 183 is disposed in the order of three inches from the machining site 191.

The weld alignment sensor 183 is used to determine whether the laser beam is directed along its path 178 onto the point of intersection between the inner grid straps 20a and 20b, as illustrated in FIG. 9A or whether the laser beam path 178 is misaligned with respect to the point 24 of intersection, whereby the machining site 191 is misplaced as shown in FIG. 9B. When the laser beam is directed onto the point 24 of intersection, there results an acceptable, structurally sound intersect weld 32, as shown in FIG. 9A due to the precise alignment with the point 24 of intersection between the inner grid straps 20a and 20b and the laser beam 178. By contrast if the machining site 191 is misplaced, as shown in FIG. 9B, there is no intersect weld 32 made between the straps 20, i.e. the tab portions 50a and 50b of the interstrap 20a are not melted together with the projection portion 48 of the inner grip strap 20a. As a result, the grid straps 20a and 20b are not welded together; in other words, a defective weld is produced.

As explained above, a controlled number of pulses of laser radiation are directed along a laser path 178 onto the machining site 191. If the site 191 is accurately aligned with the point 24 of intersection, each successive pulse of laser radiation serves to gradually increase the melt temperature of the point 24, and to melt the tab portions 50a and 50b with the projection tab 148 to form the intersect weld 32. The photodiode 185 senses the radiation and in particular the infrared radiation reflected from the machining site 191 to provide, as will be explained, an indication of whether alignment has been achieved and thus an acceptable weld produced. FIG. 8A shows the output of the photodiode 195 as representative of the radiation reflected from the machining site, as well as the residual temperature of the site 191. If alignment is achieved, each successive pulse of laser radiation will produce as shown in FIG. 8A a spike of reflected radiation, as well as a gradual increase of the residual weld site temperature with each successive laser pulse. By contrast, if the weld site 191 is misaligned with respect to the point 24 of intersection, the weld site temperature remains substantially constant and will not increase as shown in FIG. 8B, thus indicating misalignment of the laser beam 178 with respect to the point 24 of intersection and thus indicative of an unacceptable intersect weld 32. As seen in FIG. 9B, a misaligned machining site 191 being but a single strap 20 does not provide the necessary mass to store the heat of the laser pulses, which is quickly dissipated between laser pulses.

The output of the photodiode 185 is applied to the weld alignment detection circuit 1400 as shown in FIGS. 12A, B, and C. In particular, the photodiode output is applied via an input terminal 1402 and a pair of operational amplifiers 1404 and 1406 to provide an amplified input signal to a sample and hold circuit 1408. In addition, a Zener diode Z1 is provided to clip the laser spikes as shown in FIGS. 8A and 8B, thus applying an amplified signal to the sample and hold circuit 1408 indicative of the residual heat of the machining site 191. In addition, a clock or laser synchronizing signal, as shown in FIG. 11A, is applied via input terminal 1418 to a multivibrator 1420 to provide a fixed pulse width sufficient for the particular characteristics of the sample and hold circuit 1408 to time its sampling function; the pulse width of the output of the multivibrator 1420 is set by a potentiometer R2, whereby a single pulse of adjusted pulse width and of a frequency corresponding to that of the laser sync signal is provided. To this end, a second multivibrator 1422 serves to invert this output to provide a negative going pulse to the sample input of the sampling hold circuit 1408. The laser sync signal as applied to the input terminal 1418 is shown in FIG. 11A, and as explained above, is of a pulse width and frequency set to impart the desired energy level to the machining site 191 dependent upon the characteristics of the desired weld. Illustratively, the pulse width and frequency of the sync signal for an intersect weld 32 is selected to be 6 ms and 20 PPS, respectively. In particular, the pulse width and frequency are set into one of four modules, corresponding to each of the four weld types of the laser control system 592, as shown in FIGS. 5A and B. Thus, the sampling and hold circuit 1408 samples the amplified output of the photodiode 185 at a rate corresponding to the emission of laser pulses to provide an analog output indicative of the amplitude of the sampled diode output. It has been found necessary to sample the photodiode output in synchronization with emission of each laser pulse in order that the photodiode 185 may accurately sense the reflected radiation from the machining site 191.

As shown in FIGS. 12A, B, and C, the sampling and hold output is converted from an analog to digital value by an analog to digital converter 1410, whose digital output is applied to a digital comparator 1412 that compares the digital, sampled representation of the photodiode output with a digital value corresponding to a minimum acceptable value of the residual heat of the machining site 191 as provided from the outputs of the data selector/multiplexors 1414a–d. As shown in FIG. 8A, if there is alignment between the laser beam 178 and the point 24 of intersection, the residual heat of the site 191 increases at a known rate as a function of time and in particular of the number of laser pulses directed to the site 191. In particular, the digital value applied to the inputs B0–B3 of the comparator 1412 is increased as a function of the number of laser pulses applied to the machining site 191, and is compared with a sampled value of the photodiode output. If the photodiode output is greater, the comparator 1412 provides an output signal to clock a binary counter 1428. More specifically, the output of the comparator 1412 is applied via a NAND gate 1426 to the clocking input CA of the counter 1428. A further signal is applied by the A/D converter 1410 indicative of the end of conversion, to the NAND gate 1426 to time the application of the comparator output to the counter 1428, thus ensuring that the comparison of a particular photodiode sample is taken after that photodiode output has been converted to a digital signal.

From the above output, it is seen that the counter 1428 is only clocked if the sample of photodiode output exceeds a constantly increasing value corresponding to the minimum residual temperature of the machining site 191, as seen in FIG. 9A. If each photodiode sample exceeds the increasing minimum level for each of a given number of pulses as required to make a weld, a binary comparator 1432 provides an output signal indicative of an aligned, acceptable weld. In particular, a switch 1434 is set to provide an input to the B0–B3 inputs of the comparator 1432 indicative of the set number of laser pulses required to effect the intersect weld 32. If the counter 1428 receives a like number of outputs of the comparator 1412 indicative of an aligned site 191, the binary inputs A0–A3 will exceed the corresponding value applied to the inputs B0–B3 to derive a weld acceptable output from the comparator 1432.

Figure 12B:
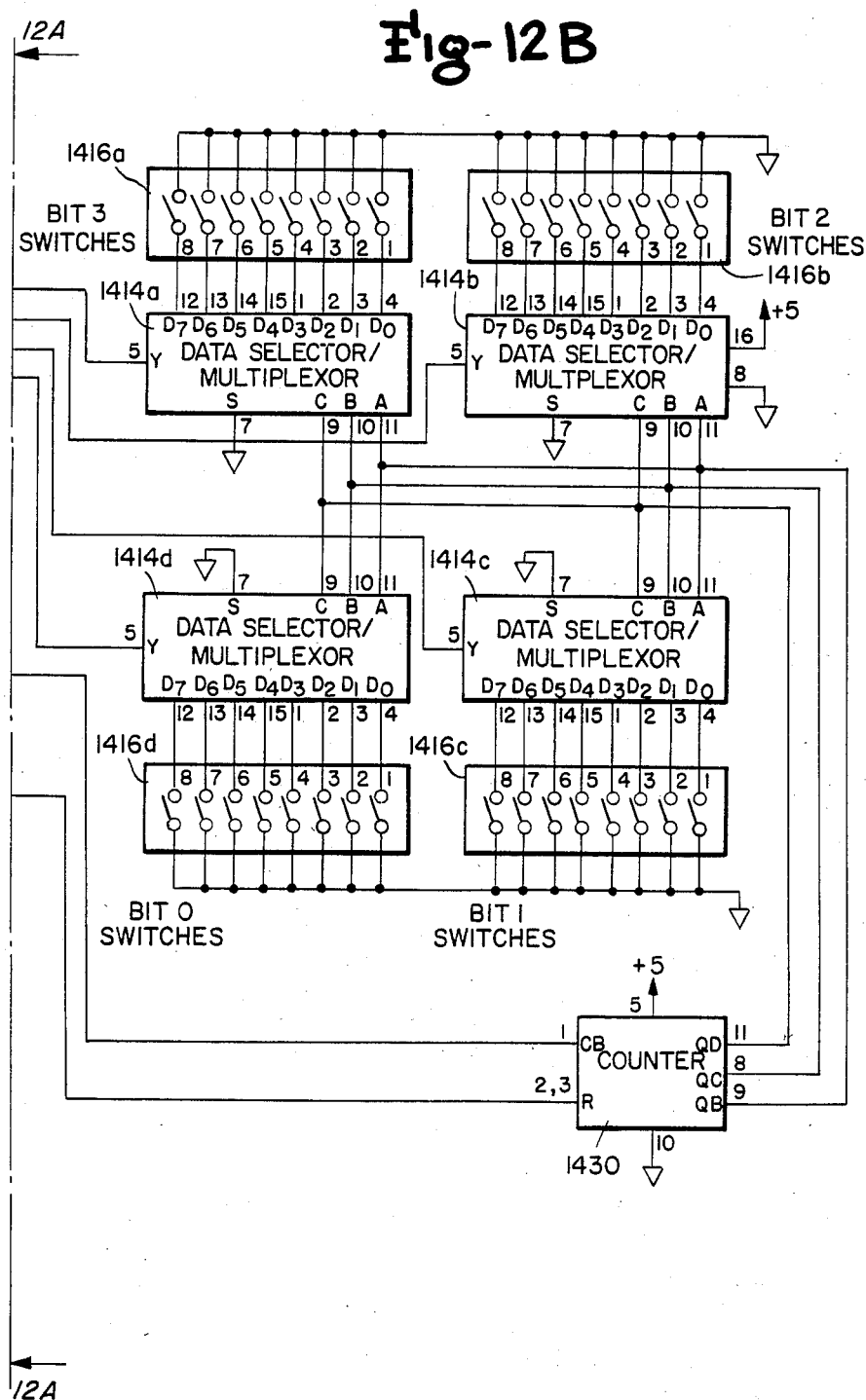
FIGS. 12A, B and C are a detailed circuit diagram of a weld alignment detection circuit for processing the output of a photodiode, as shown in FIG. 4, disposed to serve radiation reflected from an intersect of the fuel rod grid.

The laser sync signal is also applied to a multivibrator 1436 whose output goes low for an interval set by a potentiometer R3 to a width corresponding to the expected interval required to emit the selected number of the laser pulses for effecting an intersect weld 32. At the end of that time interval, the output of the multivibrator 1436 goes high to reset the counter 1428. While the output of the multivibrator 1436 is low, the counter 1428 continues to count the output signals of the comparator 1412 as derived through the NAND gate 1426 as indicative of a gradually increasing weld site temperature. The output of the multivibrator 1436 is also applied to reset a four bit counter 1430, whose outputs QD, QC and QB are applied to address each of the data selector/multiplexors 1414a–d to provide at their outputs Y binary signals indicative of the next increasing threshold value of or minimum acceptable level of the weld site temperature. As shown in FIG. 12B, each multiplexor 1414a–d is associated with a corresponding switch 1416a–d, which may be set with an increment corresponding to that minimum incremental change of weld site temperature from one laser pulse to the next required to produce an acceptable weld. A clock signal corresponding to the emission of each of the laser pulses is derived from the multivibrators 1420, 1422, and 1424, whereby the output of the counter 1430 changes to address the multiplexors 1414a–d to output the next correspondingly higher value of the minimum weld site temperature.

Figure 12C:
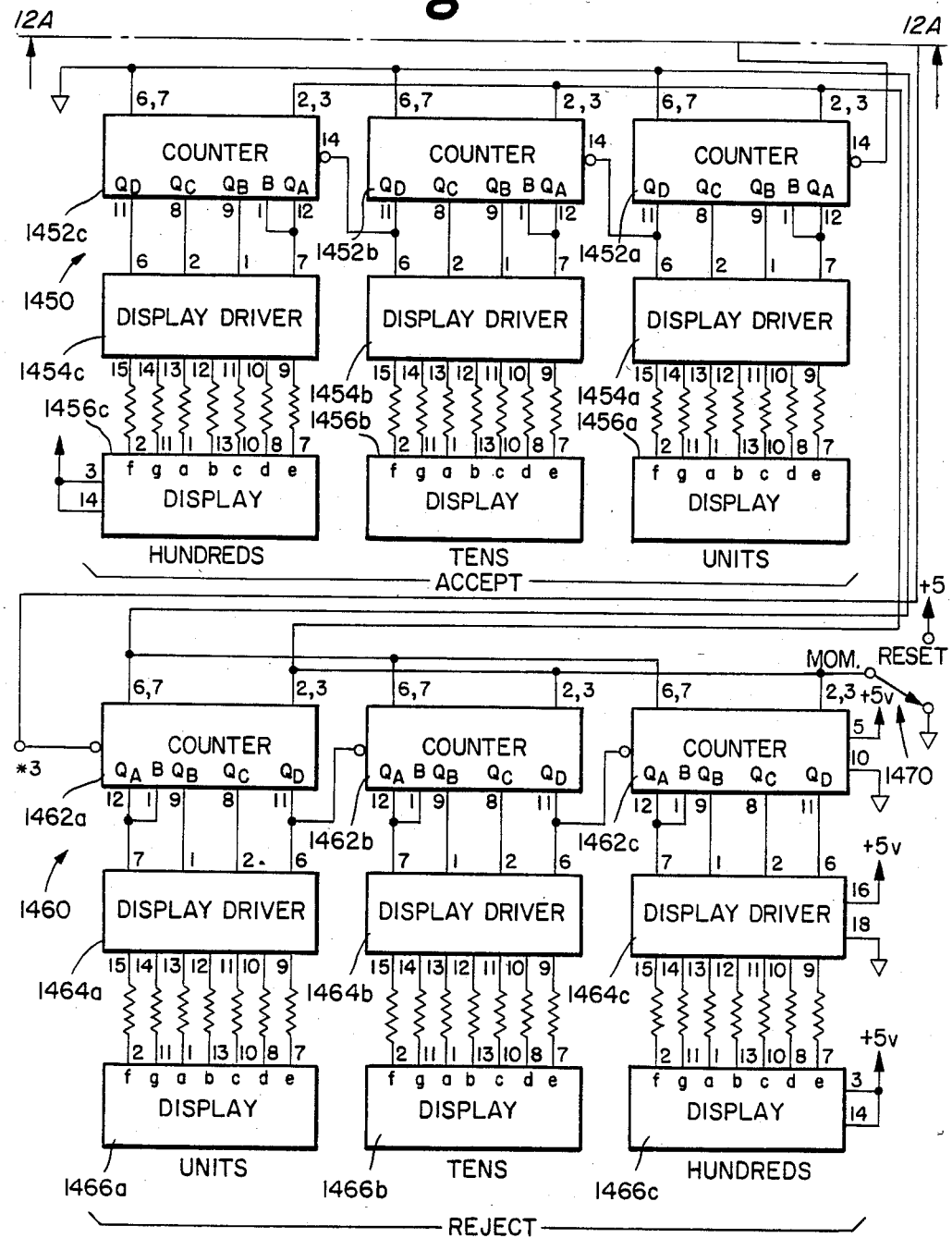

The output of the comparator 1432 indicative of whether an acceptable weld has been achieved or not, is applied directly to an input of the NAND gate 1442 and via an inverter 1446 to an input of the counter 1428. The other input to each of the NAND gates 1442 and 1444 is derived from a multivibrator 1438, whose input is coupled to receive the laser sync signal to provide an output pulse going low for an interval set by potentiometer R4 to correspond to that period required to emit the selected number of laser pulses for completing an intersect weld 32. The output of the multivibrator 1438 is inverted by the multivibrator 1440 to provide a high going pulse of like duration. When the output of the multivibrator 1440 goes low, each of the NAND gates 1442 and 1444 is enabled to permit the passage of the comparator output to a circuit for counting and displaying the number of acceptable or unacceptable welds. In particular, a high output of the comparator 1432 indicative of an acceptable weld is applied via an enabled NAND gate 1442 to an acceptable weld counter 1450 comprised of a set of cascaded decade counters 1452a–c for counting respectively the units, tens and hundreds place of the number of acceptable welds. In this regard, the fuel rod grid 16 includes seventeen by seventeen inner grid straps thus requiring 256 intersect welds 32. Each of the counters 1452a–c is associated with corresponding ones of a set of display drivers 1454a–c and of digital displays 1456a–c. In similar fashion, if the output of the comparator 1432 indicates an unacceptable weld, the enabled NAND gate 1444 applies a single count to an unacceptable weld counter 1460 comprised of a set of counters 1462a–c and corresponding display drivers 1464a–c and digital displays 1466a–c to provide a visual display of the number of misaligned or unacceptable welds produced on the work piece. As illustrated in FIG. 12C, a switch 1470 is coupled to the reset terminals of each of the counters 1452a–c and 1462a–c, whereby when a new work piece, e.g. a new fuel rod grid 16, is to be welded, the counters may be reset to provide new counts of acceptable and unacceptable welds.

In considering this invention, it should be remembered that the present disclosure is illustrative only and the scope of the invention should be determined by the appended claims.

We claim:

1. Laser machining apparatus for generating and precisely directing a laser beam onto a machining site of a work piece, said laser machining apparatus comprising:
   (a) a laser source for emitting a laser beam in the form of laser pulses;
   (b) means for focusing precisely the laser beam along a laser path to the machining site;
   (c) radiation sensitive means oriented with respect to the laser path to receive radiation reflected from a weld site aligned with respect to the laser path and responsive to the reflected radiation for providing an output signal indicative of the level of the reflected radiation; and
   (d) alignment detection means coupled to receive the output signal for measuring the rate of increase of the output signal during the machining of the machining site and for comparing the measured rate of increase of the output signal indicative of the level of the reflected radiation with respect to a minimum acceptable rate of increase of said output signal to determine whether the machining site has been aligned precisely with respect to the laser path.

2. The laser machining apparatus as claimed in claim 1, wherein there is included means for moving the work piece with respect to the laser path.

3. The laser welding apparatus as claimed in claim 2, wherein the work piece includes a plurality of machining sites and there is included control means for controlling the movement of said moving means to sequentially move the machining sites such that each of its machining sites is aligned with said laser path, said alignment detection means for providing a manifestation indicative of whether each of said machining sites has been aligned with said laser path.

4. The laser machining apparatus as claimed in claim 2, wherein the work piece comprises first and second intersecting plates and the machining site comprises a point of intersection of the first and second intersecting plates, said alignment detection means determining whether the point of intersection has been aligned with respect to the laser path.

5. The laser machining apparatus as claimed in claim 1, wherein said alignment detection means comprises means for sampling the output signal of said radiation sensitive means at regular intervals less than the machining time of a machining site and for storing the sampled output signals.

6. The laser machining apparatus as claimed in claim 5, wherein said alignment detection means comprises means for comparing each sampled output signal with a minimum acceptable level of the output signal indicative of the level of the reflected radiation increasing with each laser pulse and means for determining whether each sampled output signal exceeds the minimum acceptable level to provide an indication of whether the machining site has been aligned precisely with the laser path.

7. The laser machining apparatus as claimed in claim 5, wherein there is included means for directing radiation of a selected frequency onto said laser source, said sampling and storing means sampling the output of said radiation means at the same frequency.

8. The laser machining apparatus as claimed in claim 7, wherein said alignment detection means comprises means for variably setting the rate of increase of the minimum acceptable level of the output signal indicative of the level of the reflected radiation.

9. The laser machining apparatus as claimed in claim 1, wherein there is included means for generating a series of timing signals, each timing signal corresponding to the emission of a laser pulse onto the machining site of the work piece, and means for sampling the output signal of said radiation sensitive means in response to each timing signal.

10. The laser machining apparatus as claimed in claim 9, wherein there is included means for comparing each sampled output signal with a minimum acceptable level of the machining site heat increasing in response to each timing signal to provide an indication of whether the machining site is precisely aligned with the laser path.

11. The laser machining apparatus as claimed in claim 10, wherein said comparing means includes counting means for counting the timing signals to provide a count manifestation, and means responsive to the count manifestation for increasing the minimum acceptable level of machining site heat as a function of the count manifestation.

12. The laser machining apparatus as claimed in claim 10, wherein said alignment detection means comprises means for variably setting the rate at which the minimum acceptable level of machining site heat is increased as a function of the count manifestation.

13. The laser machining apparatus as claimed in claim 10, wherein said comparing means provides an output for each comparison of the sampled output of said radiation sensitive means that is above the minimum acceptable level, and counting means for counting the number of the output signals of said comparison means up to a selected number indicative of the number of laser pulses required to complete the machining of a site of the work piece to provide an indication that the machining site is precisely aligned with the laser path.

14. The laser machining apparatus as claimed in claim 13, wherein there is included means for resetting said counting means after the application of the selected number of laser pulses to the machining site.

15. The laser machining apparatus as claimed in claim 11, wherein there is included means for resetting said counting means after the application of a selected number of laser pulses to the machining site of the work piece.

16. The laser machining apparatus as claimed in claim 13, wherein there is included second counting means for counting the manifestations indicative of a precisely aligned machining site from said first mentioned counting means for providing a manifestation indicative of the number of acceptable machined sites of the work piece.

17. A method, in the manufacture of nuclear reactor fuel assembly spacer grids, for spot welding two intersecting zirconium alloy grid straps together at their point of intersection, comprising the steps of:
  (a) disposing said two grid straps such that said point of intersection is aligned with respect to a laser beam of a pulsed laser; and
  (b) applying a whole number of laser pulses from said laser onto said point of intersection at a pulse repetition rate selected in the range of 15 to 25 pulses per second, a pulse width selected in the range of 3 to 9 ms, and a pulse peak power level selected in the range of 2000 to 4000 watts.

18. The method of claim 17, wherein:
  (a) said two grid straps each have a thickness of about 18 mils;
  (b) said two grid straps have consumable welding tabs located at said point of intersection;
  (c) said pulse repetition rate is about 20 pulses per second;
  (d) said pulse width is about 6.2 ms;
  (e) said pulse weak power level is about 2580 watts; and
  (f) said number of pulses is 6.

19. The method of claim 17, also for determining whether said alignment of said point of intersection with respect to said laser beam was accurate, comprising the additional steps of:
  (c) detecting the reflected radiation along said laser beam during said application of said laser pulses;
  (d) determining the rate of increase of said reflected radiation detected during said application of said laser pulses; and
  (e) determining if said rate of increase is above a predetermined level which indicates accurate said alignment.

* * * * *